US011762623B2

(12) United States Patent
McCall

(10) Patent No.: US 11,762,623 B2
(45) Date of Patent: Sep. 19, 2023

(54) REGISTRATION OF LOCAL CONTENT BETWEEN FIRST AND SECOND AUGMENTED REALITY VIEWERS

(71) Applicant: Magic Leap, Inc., Plantation, FL (US)

(72) Inventor: Marc Alan McCall, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 28 days.

(21) Appl. No.: 17/429,100

(22) PCT Filed: Feb. 26, 2020

(86) PCT No.: PCT/US2020/019871
§ 371 (c)(1),
(2) Date: Aug. 6, 2021

(87) PCT Pub. No.: WO2020/185405
PCT Pub. Date: Sep. 17, 2020

(65) Prior Publication Data
US 2022/0130116 A1    Apr. 28, 2022

Related U.S. Application Data

(60) Provisional application No. 62/836,417, filed on Apr. 19, 2019, provisional application No. 62/817,318, filed on Mar. 12, 2019.

(51) Int. Cl.
*G06F 3/147*        (2006.01)
*G06T 7/70*         (2017.01)
(Continued)

(52) U.S. Cl.
CPC .......... *G06F 3/147* (2013.01); *G02B 27/017* (2013.01); *G06F 3/011* (2013.01); *G06T 7/70* (2017.01);
(Continued)

(58) Field of Classification Search
CPC ........ G06F 3/147; G06F 3/011; G06F 3/0346; G02B 27/017; G02B 2027/0138;
(Continued)

(56) References Cited

U.S. PATENT DOCUMENTS 4,344,092 A    8/1982  Miller
4,652,930 A    3/1987  Crawford
(Continued)

FOREIGN PATENT DOCUMENTS

CN    101449270 A    6/2009
CN    104040410 A    9/2014
(Continued)

OTHER PUBLICATIONS

"Extended European Search Report dated Aug. 24, 2022", European Patent Application No. 20846338.0, (13 pages).
(Continued)

*Primary Examiner* — Ryan R Yang
(74) *Attorney, Agent, or Firm* — Stephen M. De Klerk

(57) ABSTRACT

A method of viewing image data of local content is disclosed. An augmented reality view is created by storing a first device coordinate frame (DCF), moving a first registration marker to select a first feature point (FP1) and a second feature point (FP2) on at least one real-word object viewable by the user through a display. A uniform coordinate system (UCS) alignment module stores locations of the registration marker when selecting the FP1 and the FP2, determines a user coordinate frame (UCF) based on the locations of the first registration marker when selecting the FP1 and the FP2, transforms the DCF to the UCF and displays image data of local content received on a first data source with a projector through the display to the user based on the transformation from the first DCF to the first UCF.

20 Claims, 8 Drawing Sheets

(51) Int. Cl.
  *G06V 20/20* (2022.01)
  *G02B 27/01* (2006.01)
  *G06F 3/01* (2006.01)
  *G06T 19/00* (2011.01)
  *G06V 10/147* (2022.01)

(52) U.S. Cl.
  CPC .......... *G06T 19/006* (2013.01); *G06V 10/147* (2022.01); *G06V 20/20* (2022.01); *G02B 2027/0138* (2013.01)

(58) Field of Classification Search
  CPC ...... G02B 2027/014; G02B 2027/0178; G06T 7/70; G06T 19/006; G06V 10/147; G06V 20/20; H04N 13/344
  See application file for complete search history.

(56) References Cited

U.S. PATENT DOCUMENTS

| | | | |
|---|---|---|---|
| 4,810,080 A | 3/1989 | Grendol et al. |
| 4,997,268 A | 3/1991 | Dauvergne |
| 5,007,727 A | 4/1991 | Kahaney et al. |
| 5,074,295 A | 12/1991 | Willis |
| 5,240,220 A | 8/1993 | Elberbaum |
| 5,251,635 A | 10/1993 | Dumoulin et al. |
| 5,410,763 A | 5/1995 | Bolle |
| 5,455,625 A | 10/1995 | Englander |
| 5,495,286 A | 2/1996 | Adair |
| 5,497,463 A | 3/1996 | Stein et al. |
| 5,682,255 A | 10/1997 | Friesem et al. |
| 5,826,092 A | 10/1998 | Flannery |
| 5,854,872 A | 12/1998 | Tai |
| 5,864,365 A | 1/1999 | Sramek et al. |
| 5,937,202 A | 8/1999 | Crosetto |
| 6,012,811 A | 1/2000 | Chao et al. |
| 6,016,160 A | 1/2000 | Coombs et al. |
| 6,064,749 A | 5/2000 | Hirota et al. |
| 6,076,927 A | 6/2000 | Owens |
| 6,117,923 A | 9/2000 | Amagai et al. |
| 6,124,977 A | 9/2000 | Takahashi |
| 6,191,809 B1 | 2/2001 | Hori et al. |
| 6,375,369 B1 | 4/2002 | Schneider et al. |
| 6,385,735 B1 | 5/2002 | Wilson |
| 6,538,655 B1 | 3/2003 | Kubota |
| 6,541,736 B1 | 4/2003 | Huang et al. |
| 6,757,068 B2 | 6/2004 | Foxlin |
| 7,046,515 B1 | 5/2006 | Wyatt |
| 7,051,219 B2 | 5/2006 | Hwang |
| 7,076,674 B2 | 7/2006 | Cervantes |
| 7,111,290 B1 | 9/2006 | Yates, Jr. |
| 7,119,819 B1 | 10/2006 | Robertson et al. |
| 7,219,245 B1 | 5/2007 | Raghuvanshi |
| 7,431,453 B2 | 10/2008 | Hogan |
| 7,542,040 B2 | 6/2009 | Templeman |
| 7,573,640 B2 | 8/2009 | Nivon et al. |
| 7,724,980 B1 | 5/2010 | Shenzhi |
| 7,751,662 B2 | 7/2010 | Kleemann |
| 7,758,185 B2 | 7/2010 | Lewis |
| 8,060,759 B1 | 11/2011 | Arnan et al. |
| 8,120,851 B2 | 2/2012 | Iwasa |
| 8,214,660 B2 | 7/2012 | Capps, Jr. |
| 8,246,408 B2 | 8/2012 | Elliot |
| 8,353,594 B2 | 1/2013 | Lewis |
| 8,360,578 B2 | 1/2013 | Nummela et al. |
| 8,508,676 B2 | 8/2013 | Silverstein et al. |
| 8,547,638 B2 | 10/2013 | Levola |
| 8,605,764 B1 | 10/2013 | Rothaar et al. |
| 8,619,365 B2 | 12/2013 | Harris et al. |
| 8,696,113 B2 | 4/2014 | Lewis |
| 8,698,701 B2 | 4/2014 | Margulis |
| 8,733,927 B1 | 5/2014 | Lewis |
| 8,736,636 B2 | 5/2014 | Kang |
| 8,759,929 B2 | 6/2014 | Shiozawa et al. |
| 8,793,770 B2 | 7/2014 | Lim |
| 8,823,855 B2 | 9/2014 | Hwang |
| 8,847,988 B2 | 9/2014 | Geisner et al. |
| 8,874,673 B2 | 10/2014 | Kim |
| 9,010,929 B2 | 4/2015 | Lewis |
| 9,015,501 B2 | 4/2015 | Gee |
| 9,086,537 B2 | 7/2015 | Iwasa et al. |
| 9,095,437 B2 | 8/2015 | Boyden et al. |
| 9,239,473 B2 | 1/2016 | Lewis |
| 9,244,293 B2 | 1/2016 | Lewis |
| 9,244,533 B2 | 1/2016 | Friend et al. |
| 9,383,823 B2 | 7/2016 | Geisner et al. |
| 9,489,027 B1 | 11/2016 | Ogletree |
| 9,519,305 B2 | 12/2016 | Wolfe |
| 9,581,820 B2 | 2/2017 | Robbins |
| 9,582,060 B2 | 2/2017 | Balatsos |
| 9,658,473 B2 | 5/2017 | Lewis |
| 9,671,566 B2 | 6/2017 | Abovitz et al. |
| 9,671,615 B1 | 6/2017 | Vallius et al. |
| 9,696,795 B2 | 7/2017 | Marcolina et al. |
| 9,798,144 B2 | 10/2017 | Sako et al. |
| 9,874,664 B2 | 1/2018 | Stevens et al. |
| 9,880,441 B1 | 1/2018 | Osterhout |
| 9,918,058 B2 | 3/2018 | Takahasi et al. |
| 9,955,862 B2 | 5/2018 | Freeman et al. |
| 9,978,118 B2 | 5/2018 | Ozgumer et al. |
| 9,996,797 B1 | 6/2018 | Holz et al. |
| 10,018,844 B2 | 7/2018 | Levola et al. |
| 10,082,865 B1 | 9/2018 | Raynal et al. |
| 10,151,937 B2 | 12/2018 | Lewis |
| 10,185,147 B2 | 1/2019 | Lewis |
| 10,218,679 B1 | 2/2019 | Jawahar |
| 10,241,545 B1 | 3/2019 | Richards et al. |
| 10,317,680 B1 | 6/2019 | Richards et al. |
| 10,436,594 B2 | 10/2019 | Belt et al. |
| 10,516,853 B1 | 12/2019 | Gibson et al. |
| 10,551,879 B1 | 2/2020 | Richards et al. |
| 10,578,870 B2 | 3/2020 | Kimmel |
| 10,698,202 B2 | 6/2020 | Kimmel et al. |
| 10,856,107 B2 | 10/2020 | Mycek et al. |
| 10,825,424 B2 | 11/2020 | Zhang |
| 10,987,176 B2 | 4/2021 | Poltaretskyi et al. |
| 11,190,681 B1 | 11/2021 | Brook et al. |
| 11,209,656 B1 | 12/2021 | Choi et al. |
| 11,236,993 B1 | 2/2022 | Hall et al. |
| 2001/0010598 A1 | 8/2001 | Aritake et al. |
| 2002/0007463 A1 | 1/2002 | Fung |
| 2002/0108064 A1 | 2/2002 | Nunally |
| 2002/0063913 A1 | 5/2002 | Nakamura et al. |
| 2002/0071050 A1 | 6/2002 | Homberg |
| 2002/0122648 A1 | 9/2002 | Mule'et al. |
| 2002/0140848 A1 | 10/2002 | Cooper et al. |
| 2003/0028816 A1 | 2/2003 | Bacon |
| 2003/0048456 A1 | 3/2003 | Hill |
| 2003/0067685 A1 | 4/2003 | Niv |
| 2003/0077458 A1 | 4/2003 | Korenaga et al. |
| 2003/0115494 A1 | 6/2003 | Cervantes |
| 2003/0218614 A1 | 11/2003 | Lavelle et al. |
| 2003/0219992 A1 | 11/2003 | Schaper |
| 2003/0226047 A1 | 12/2003 | Park |
| 2004/0001533 A1 | 1/2004 | Tran et al. |
| 2004/0021600 A1 | 2/2004 | Wittenberg |
| 2004/0025069 A1 | 2/2004 | Gary et al. |
| 2004/0042377 A1 | 3/2004 | Nikoloai et al. |
| 2004/0073822 A1 | 4/2004 | Greco |
| 2004/0073825 A1 | 4/2004 | Itoh |
| 2004/0111248 A1 | 6/2004 | Granny et al. |
| 2004/0174496 A1 | 9/2004 | Ji et al. |
| 2004/0186902 A1 | 9/2004 | Stewart |
| 2004/0201857 A1 | 10/2004 | Foxlin |
| 2004/0238732 A1 | 12/2004 | State et al. |
| 2004/0240072 A1 | 12/2004 | Schindler et al. |
| 2004/0246391 A1 | 12/2004 | Travis |
| 2004/0268159 A1 | 12/2004 | Aasheim et al. |
| 2005/0001977 A1 | 1/2005 | Zelman |
| 2005/0034002 A1 | 2/2005 | Flautner |
| 2005/0157159 A1 | 7/2005 | Komiya et al. |
| 2005/0177385 A1 | 8/2005 | Hull |
| 2005/0231599 A1 | 10/2005 | Yamasaki |
| 2005/0273792 A1 | 12/2005 | Inohara et al. |

(56) References Cited

U.S. PATENT DOCUMENTS

| | | |
|---|---|---|
| 2006/0013435 A1 | 1/2006 | Rhoads |
| 2006/0015821 A1 | 1/2006 | Jacques Parker et al. |
| 2006/0019723 A1 | 1/2006 | Vorenkamp |
| 2006/0038880 A1 | 2/2006 | Starkweather et al. |
| 2006/0050224 A1 | 3/2006 | Smith |
| 2006/0090092 A1 | 4/2006 | Verhulst |
| 2006/0126181 A1 | 6/2006 | Levola |
| 2006/0129852 A1 | 6/2006 | Bonola |
| 2006/0132914 A1 | 6/2006 | Weiss et al. |
| 2006/0179329 A1 | 8/2006 | Terechko |
| 2006/0221448 A1 | 10/2006 | Nivon et al. |
| 2006/0228073 A1 | 10/2006 | Mukawa et al. |
| 2006/0250322 A1 | 11/2006 | Hall et al. |
| 2006/0259621 A1 | 11/2006 | Ranganathan |
| 2006/0268220 A1 | 11/2006 | Hogan |
| 2007/0058248 A1 | 3/2007 | Nguyen et al. |
| 2007/0103836 A1 | 5/2007 | Oh |
| 2007/0124730 A1 | 5/2007 | Pytel |
| 2007/0159673 A1 | 7/2007 | Freeman et al. |
| 2007/0188837 A1 | 8/2007 | Shimizu et al. |
| 2007/0198886 A1 | 8/2007 | Saito |
| 2007/0204672 A1 | 9/2007 | Huang et al. |
| 2007/0213952 A1 | 9/2007 | Cirelli |
| 2007/0283247 A1 | 12/2007 | Brenneman et al. |
| 2008/0002259 A1 | 1/2008 | Ishizawa et al. |
| 2008/0002260 A1 | 1/2008 | Arrouy et al. |
| 2008/0043334 A1 | 2/2008 | Itzkovitch et al. |
| 2008/0046773 A1 | 2/2008 | Ham |
| 2008/0063802 A1 | 3/2008 | Maula et al. |
| 2008/0068557 A1 | 3/2008 | Menduni et al. |
| 2008/0146942 A1 | 6/2008 | Dala-Krishna |
| 2008/0173036 A1 | 7/2008 | Williams |
| 2008/0177506 A1 | 7/2008 | Kim |
| 2008/0205838 A1 | 8/2008 | Crippa et al. |
| 2008/0215907 A1 | 9/2008 | Wilson |
| 2008/0225393 A1 | 9/2008 | Rinko |
| 2008/0316768 A1 | 12/2008 | Travis |
| 2009/0153797 A1 | 6/2009 | Allon et al. |
| 2009/0224416 A1 | 9/2009 | Laakkonen et al. |
| 2009/0245730 A1 | 10/2009 | Kleemann |
| 2009/0310633 A1 | 12/2009 | Ikegami |
| 2010/0005326 A1 | 1/2010 | Archer |
| 2010/0019962 A1 | 1/2010 | Fujita |
| 2010/0056274 A1 | 3/2010 | Uusitalo et al. |
| 2010/0063854 A1 | 3/2010 | Purvis et al. |
| 2010/0079841 A1 | 4/2010 | Levola |
| 2010/0153934 A1 | 6/2010 | Lachner |
| 2010/0194632 A1 | 8/2010 | Raento et al. |
| 2010/0232016 A1 | 9/2010 | Landa et al. |
| 2010/0232031 A1 | 9/2010 | Batchko et al. |
| 2010/0244168 A1 | 9/2010 | Shiozawa et al. |
| 2010/0277803 A1 | 11/2010 | Pockett et al. |
| 2010/0284085 A1 | 11/2010 | Laakkonen |
| 2010/0296163 A1 | 11/2010 | Sarikko |
| 2011/0021263 A1 | 1/2011 | Anderson et al. |
| 2011/0022870 A1 | 1/2011 | Mcgrane |
| 2011/0050640 A1 | 3/2011 | Lundback et al. |
| 2011/0050655 A1 | 3/2011 | Mukawa |
| 2011/0122240 A1 | 5/2011 | Becker |
| 2011/0145617 A1 | 6/2011 | Thomson et al. |
| 2011/0170801 A1 | 7/2011 | Lu et al. |
| 2011/0218733 A1 | 9/2011 | Hamza et al. |
| 2011/0286735 A1 | 11/2011 | Temblay |
| 2011/0291969 A1 | 12/2011 | Rashid et al. |
| 2012/0011389 A1 | 1/2012 | Driesen |
| 2012/0050535 A1 | 3/2012 | Densham et al. |
| 2012/0075501 A1 | 3/2012 | Oyagi et al. |
| 2012/0081392 A1 | 4/2012 | Arthur |
| 2012/0089854 A1 | 4/2012 | Breakstone |
| 2012/0113235 A1 | 5/2012 | Shintani |
| 2012/0127062 A1 | 5/2012 | Bar-Zeev et al. |
| 2012/0154557 A1 | 6/2012 | Perez et al. |
| 2012/0218301 A1 | 8/2012 | Miller |
| 2012/0246506 A1 | 9/2012 | Knight |
| 2012/0249416 A1 | 10/2012 | Maciocci et al. |
| 2012/0249741 A1 | 10/2012 | Maciocci et al. |
| 2012/0260083 A1 | 10/2012 | Andrews |
| 2012/0307075 A1 | 12/2012 | Margalitq |
| 2012/0307362 A1 | 12/2012 | Silverstein et al. |
| 2012/0314959 A1 | 12/2012 | White et al. |
| 2012/0320460 A1 | 12/2012 | Levola |
| 2012/0326948 A1 | 12/2012 | Crocco et al. |
| 2013/0021486 A1 | 1/2013 | Richardon |
| 2013/0050258 A1 | 2/2013 | Liu et al. |
| 2013/0050642 A1 | 2/2013 | Lewis et al. |
| 2013/0050833 A1 | 2/2013 | Lewis et al. |
| 2013/0051730 A1 | 2/2013 | Travers et al. |
| 2013/0061240 A1 | 3/2013 | Yan et al. |
| 2013/0077049 A1 | 3/2013 | Bohn |
| 2013/0077170 A1 | 3/2013 | Ukuda |
| 2013/0094148 A1 | 4/2013 | Sloane |
| 2013/0129282 A1 | 5/2013 | Li |
| 2013/0162940 A1 | 6/2013 | Kurtin et al. |
| 2013/0169923 A1 | 7/2013 | Schnoll et al. |
| 2013/0205126 A1 | 8/2013 | Kruglick |
| 2013/0222386 A1 | 8/2013 | Tannhauser et al. |
| 2013/0268257 A1 | 10/2013 | Hu |
| 2013/0278633 A1 | 10/2013 | Ahn et al. |
| 2013/0314789 A1 | 11/2013 | Saarikko et al. |
| 2013/0318276 A1 | 11/2013 | Dalal |
| 2013/0336138 A1 | 12/2013 | Venkatraman et al. |
| 2013/0342564 A1 | 12/2013 | Kinnebrew et al. |
| 2013/0342570 A1 | 12/2013 | Kinnebrew et al. |
| 2013/0342571 A1 | 12/2013 | Kinnebrew et al. |
| 2013/0343408 A1 | 12/2013 | Cook |
| 2014/0013098 A1 | 1/2014 | Yeung |
| 2014/0016821 A1 | 1/2014 | Arth et al. |
| 2014/0022819 A1 | 1/2014 | Oh et al. |
| 2014/0078023 A1 | 3/2014 | Ikeda et al. |
| 2014/0082526 A1 | 3/2014 | Park et al. |
| 2014/0119598 A1 | 5/2014 | Ramachandran et al. |
| 2014/0126769 A1 | 5/2014 | Reitmayr et al. |
| 2014/0140653 A1 | 5/2014 | Brown et al. |
| 2014/0149573 A1 | 5/2014 | Tofighbakhsh et al. |
| 2014/0168260 A1 | 6/2014 | O'Brien et al. |
| 2014/0266987 A1 | 9/2014 | Magyari |
| 2014/0267419 A1 | 9/2014 | Ballard et al. |
| 2014/0274391 A1 | 9/2014 | Stafford |
| 2014/0282105 A1 | 9/2014 | Nordstrom |
| 2014/0313228 A1 | 10/2014 | Kasahara |
| 2014/0340449 A1 | 11/2014 | Plagemann et al. |
| 2014/0359589 A1 | 12/2014 | Kodsky et al. |
| 2014/0375680 A1 | 12/2014 | Ackerman et al. |
| 2015/0005785 A1 | 1/2015 | Olson |
| 2015/0009099 A1 | 1/2015 | Queen |
| 2015/0077312 A1 | 3/2015 | Wang |
| 2015/0097719 A1 | 4/2015 | Balachandreswaran et al. |
| 2015/0123966 A1 | 5/2015 | Newman |
| 2015/0130790 A1 | 5/2015 | Vazquez, II et al. |
| 2015/0134995 A1 | 5/2015 | Park et al. |
| 2015/0138248 A1 | 5/2015 | Schrader |
| 2015/0155939 A1 | 6/2015 | Oshima et al. |
| 2015/0168221 A1 | 6/2015 | Mao et al. |
| 2015/0205126 A1 | 7/2015 | Schowengerdt |
| 2015/0235427 A1 | 8/2015 | Nobori et al. |
| 2015/0235431 A1 | 8/2015 | Schowengerdt |
| 2015/0253651 A1 | 9/2015 | Russell et al. |
| 2015/0256484 A1 | 9/2015 | Cameron |
| 2015/0269784 A1 | 9/2015 | Miyawaki et al. |
| 2015/0294483 A1 | 10/2015 | Wells et al. |
| 2015/0301955 A1 | 10/2015 | Yakovenko et al. |
| 2015/0310657 A1 | 10/2015 | Eden |
| 2015/0338915 A1 | 11/2015 | Publicover et al. |
| 2015/0355481 A1 | 12/2015 | Hilkes et al. |
| 2016/0004102 A1 | 1/2016 | Nisper et al. |
| 2016/0015470 A1 | 1/2016 | Border |
| 2016/0027215 A1 | 1/2016 | Burns et al. |
| 2016/0033770 A1 | 2/2016 | Fujimaki et al. |
| 2016/0077338 A1 | 3/2016 | Robbins et al. |
| 2016/0085285 A1 | 3/2016 | Mangione-Smith |
| 2016/0085300 A1 | 3/2016 | Robbins et al. |
| 2016/0091720 A1 | 3/2016 | Stafford et al. |
| 2016/0093099 A1 | 3/2016 | Bridges |
| 2016/0093269 A1 | 3/2016 | Buckley et al. |

(56) References Cited

U.S. PATENT DOCUMENTS

| | | |
|---|---|---|
| 2016/0123745 A1 | 5/2016 | Cotier et al. |
| 2016/0155273 A1 | 6/2016 | Lyren et al. |
| 2016/0180596 A1 | 6/2016 | Gonzalez del Rosario |
| 2016/0187654 A1 | 6/2016 | Border et al. |
| 2016/0191887 A1 | 6/2016 | Casas |
| 2016/0202496 A1 | 7/2016 | Billetz et al. |
| 2016/0217624 A1 | 7/2016 | Finn et al. |
| 2016/0266412 A1 | 9/2016 | Yoshida |
| 2016/0267708 A1 | 9/2016 | Nistico et al. |
| 2016/0274733 A1 | 9/2016 | Hasegawa et al. |
| 2016/0287337 A1 | 10/2016 | Aram et al. |
| 2016/0300388 A1 | 10/2016 | Stafford et al. |
| 2016/0321551 A1 | 11/2016 | Priness et al. |
| 2016/0327798 A1 | 11/2016 | Xiao et al. |
| 2016/0334279 A1 | 11/2016 | Mittleman et al. |
| 2016/0357255 A1 | 12/2016 | Lindh et al. |
| 2016/0370404 A1 | 12/2016 | Quadrat et al. |
| 2016/0370510 A1 | 12/2016 | Thomas |
| 2017/0038607 A1 | 2/2017 | Camara |
| 2017/0060225 A1 | 3/2017 | Zha et al. |
| 2017/0061696 A1 | 3/2017 | Li et al. |
| 2017/0064066 A1 | 3/2017 | Das et al. |
| 2017/0100664 A1 | 4/2017 | Osterhout et al. |
| 2017/0102544 A1 | 4/2017 | Vallius et al. |
| 2017/0115487 A1 | 4/2017 | Travis |
| 2017/0122725 A1 | 5/2017 | Yeoh et al. |
| 2017/0123526 A1 | 5/2017 | Trail et al. |
| 2017/0127295 A1 | 5/2017 | Black et al. |
| 2017/0131569 A1 | 5/2017 | Aschwanden et al. |
| 2017/0147066 A1 | 5/2017 | Katz et al. |
| 2017/0160518 A1 | 6/2017 | Lanman et al. |
| 2017/0161951 A1 | 6/2017 | Fix et al. |
| 2017/0185261 A1 | 6/2017 | Perez et al. |
| 2017/0192239 A1 | 7/2017 | Nakamura et al. |
| 2017/0201709 A1* | 7/2017 | Igarashi ............... H04N 23/63 |
| 2017/0205903 A1 | 7/2017 | Miller et al. |
| 2017/0206668 A1 | 7/2017 | Poulos et al. |
| 2017/0213388 A1 | 7/2017 | Margolis et al. |
| 2017/0219841 A1 | 8/2017 | Popovich et al. |
| 2017/0232345 A1 | 8/2017 | Rofougaran et al. |
| 2017/0235126 A1 | 8/2017 | DiDomenico |
| 2017/0235129 A1 | 8/2017 | Kamakura |
| 2017/0235142 A1 | 8/2017 | Wall et al. |
| 2017/0235144 A1 | 8/2017 | Piskunov et al. |
| 2017/0235147 A1 | 8/2017 | Kamakura |
| 2017/0243403 A1 | 8/2017 | Daniels et al. |
| 2017/0246070 A1 | 8/2017 | Osterhout et al. |
| 2017/0254832 A1 | 9/2017 | Ho et al. |
| 2017/0256096 A1 | 9/2017 | Faaborg et al. |
| 2017/0258526 A1 | 9/2017 | Lang |
| 2017/0266529 A1 | 9/2017 | Reikmoto |
| 2017/0270712 A1 | 9/2017 | Tyson et al. |
| 2017/0281054 A1 | 10/2017 | Stever et al. |
| 2017/0287376 A1 | 10/2017 | Bakar et al. |
| 2017/0293141 A1 | 10/2017 | Schowengerdt et al. |
| 2017/0307886 A1 | 10/2017 | Stenberg et al. |
| 2017/0307891 A1 | 10/2017 | Bucknor et al. |
| 2017/0312032 A1 | 11/2017 | Amanatullah et al. |
| 2017/0322418 A1 | 11/2017 | Liu et al. |
| 2017/0322426 A1 | 11/2017 | Tervo |
| 2017/0329137 A1 | 11/2017 | Tervo |
| 2017/0332098 A1 | 11/2017 | Rusanovskyy et al. |
| 2017/0336636 A1 | 11/2017 | Amitai et al. |
| 2017/0357332 A1 | 12/2017 | Balan et al. |
| 2017/0363871 A1 | 12/2017 | Vallius |
| 2017/0371394 A1 | 12/2017 | Chan |
| 2017/0371661 A1 | 12/2017 | Sparling |
| 2018/0014266 A1 | 1/2018 | Chen |
| 2018/0024289 A1 | 1/2018 | Fattal |
| 2018/0044173 A1 | 2/2018 | Netzer |
| 2018/0052007 A1 | 2/2018 | Teskey et al. |
| 2018/0052501 A1 | 2/2018 | Jones, Jr. et al. |
| 2018/0059305 A1 | 3/2018 | Popovich et al. |
| 2018/0067779 A1 | 3/2018 | Pillalamarri et al. |
| 2018/0070855 A1 | 3/2018 | Eichler |
| 2018/0082480 A1 | 3/2018 | White et al. |
| 2018/0088185 A1 | 3/2018 | Woods et al. |
| 2018/0102981 A1 | 4/2018 | Kurtzman et al. |
| 2018/0108179 A1 | 4/2018 | Tomlin et al. |
| 2018/0114298 A1 | 4/2018 | Malaika et al. |
| 2018/0129112 A1 | 5/2018 | Osterhout |
| 2018/0131907 A1 | 5/2018 | Schmirler et al. |
| 2018/0136466 A1 | 5/2018 | Ko |
| 2018/0144691 A1 | 5/2018 | Choi et al. |
| 2018/0150971 A1 | 5/2018 | Adachi et al. |
| 2018/0151796 A1 | 5/2018 | Akahane |
| 2018/0172995 A1 | 6/2018 | Lee et al. |
| 2018/0188115 A1 | 7/2018 | Hsu et al. |
| 2018/0189568 A1 | 7/2018 | Powderly et al. |
| 2018/0190017 A1 | 7/2018 | Mendez et al. |
| 2018/0191990 A1 | 7/2018 | Motoyama et al. |
| 2018/0218545 A1 | 8/2018 | Garcia et al. |
| 2018/0250589 A1 | 9/2018 | Cossairt et al. |
| 2018/0284877 A1 | 10/2018 | Klein |
| 2018/0292654 A1 | 10/2018 | Wall et al. |
| 2018/0299678 A1 | 10/2018 | Singer et al. |
| 2018/0357472 A1 | 12/2018 | Dreessen |
| 2019/0005069 A1 | 1/2019 | Filgueiras de Arajuo et al. |
| 2019/0011691 A1 | 1/2019 | Peyman |
| 2019/0056591 A1 | 2/2019 | Tervo et al. |
| 2019/0087015 A1 | 3/2019 | Lam et al. |
| 2019/0101758 A1 | 4/2019 | Zhu et al. |
| 2019/0107723 A1 | 4/2019 | Lee et al. |
| 2019/0137788 A1 | 5/2019 | Suen |
| 2019/0155034 A1 | 5/2019 | Singer et al. |
| 2019/0155439 A1 | 5/2019 | Mukherjee et al. |
| 2019/0158926 A1 | 5/2019 | Kang et al. |
| 2019/0167095 A1 | 6/2019 | Krueger |
| 2019/0172216 A1 | 6/2019 | Ninan et al. |
| 2019/0178654 A1 | 6/2019 | Hare |
| 2019/0196690 A1 | 6/2019 | Chong et al. |
| 2019/0206116 A1 | 7/2019 | Xu et al. |
| 2019/0219815 A1 | 7/2019 | Price et al. |
| 2019/0243123 A1 | 8/2019 | Bohn |
| 2019/0287270 A1 | 9/2019 | Nakamura et al. |
| 2019/0318502 A1 | 10/2019 | He et al. |
| 2019/0318540 A1 | 10/2019 | Piemonte et al. |
| 2019/0321728 A1 | 10/2019 | Imai et al. |
| 2019/0347853 A1 | 11/2019 | Chen et al. |
| 2019/0380792 A1 | 12/2019 | Poltaretskyi et al. |
| 2019/0388182 A1 | 12/2019 | Kumar et al. |
| 2020/0066045 A1* | 2/2020 | Stahl ............... G02B 27/01 |
| 2020/0098188 A1 | 3/2020 | Bar-Zeev et al. |
| 2020/0100057 A1 | 3/2020 | Galon et al. |
| 2020/0110928 A1 | 4/2020 | Al Jazaery et al. |
| 2020/0117267 A1 | 4/2020 | Gibson et al. |
| 2020/0117270 A1 | 4/2020 | Gibson et al. |
| 2020/0184217 A1 | 6/2020 | Faulkner |
| 2020/0184653 A1 | 6/2020 | Faulker |
| 2020/0202759 A1 | 6/2020 | Ukai et al. |
| 2020/0242848 A1 | 7/2020 | Ambler et al. |
| 2020/0309944 A1 | 10/2020 | Thoresen et al. |
| 2020/0356161 A1 | 11/2020 | Wagner |
| 2020/0368616 A1 | 11/2020 | Delamont |
| 2020/0391115 A1* | 12/2020 | Leeper ............... G06V 20/20 |
| 2020/0409528 A1 | 12/2020 | Lee |
| 2021/0008413 A1 | 1/2021 | Asikainen et al. |
| 2021/0033871 A1 | 2/2021 | Jacoby et al. |
| 2021/0041951 A1 | 2/2021 | Gibson et al. |
| 2021/0053820 A1 | 2/2021 | Gurin et al. |
| 2021/0093391 A1 | 4/2021 | Poltaretskyi et al. |
| 2021/0093410 A1 | 4/2021 | Gaborit et al. |
| 2021/0093414 A1 | 4/2021 | Moore et al. |
| 2021/0097886 A1 | 4/2021 | Kuester et al. |
| 2021/0132380 A1 | 5/2021 | Wieczorek |
| 2021/0142582 A1 | 5/2021 | Jones et al. |
| 2021/0158627 A1 | 5/2021 | Cossairt et al. |
| 2021/0173480 A1 | 6/2021 | Osterhout et al. |
| 2022/0366598 A1* | 11/2022 | Azimi ............... G09G 3/003 |

FOREIGN PATENT DOCUMENTS

| | | |
|---|---|---|
| CN | 104603675 A | 5/2015 |
| CN | 106662754 A | 5/2017 |

(56) References Cited

FOREIGN PATENT DOCUMENTS

| | | | |
|---|---|---|---|
| CN | 107683497 | A1 | 2/2018 |
| CN | 105190427 | B | 11/2019 |
| EP | 0504930 | A1 | 3/1992 |
| EP | 0535402 | A1 | 4/1993 |
| EP | 0632360 | A1 | 1/1995 |
| EP | 1215522 | A2 | 6/2002 |
| EP | 1494110 | A2 | 1/2005 |
| EP | 1938141 | A1 | 7/2008 |
| EP | 1943556 | A2 | 7/2008 |
| EP | 2290428 | A2 | 3/2011 |
| EP | 2350774 | A1 | 8/2011 |
| EP | 1237067 | B1 | 1/2016 |
| EP | 3139245 | A1 | 3/2017 |
| EP | 3164776 | B1 | 5/2017 |
| EP | 3236211 | A1 | 10/2017 |
| EP | 2723240 | B1 | 8/2018 |
| EP | 2896986 | B1 | 2/2021 |
| GB | 2499635 | A | 8/2013 |
| GB | 2542853 | A | 4/2017 |
| IN | 938/DEL/2004 | A | 6/2006 |
| JP | 2002-529806 | | 9/2002 |
| JP | 2003-029198 | A | 1/2003 |
| JP | 2003-141574 | A | 5/2003 |
| JP | 2003-228027 | A | 8/2003 |
| JP | 2003-329873 | A | 11/2003 |
| JP | 2005-303843 | A | 10/2005 |
| JP | 2007-012530 | A | 1/2007 |
| JP | 2007-86696 | A | 4/2007 |
| JP | 2007-273733 | A | 10/2007 |
| JP | 2008-257127 | A | 10/2008 |
| JP | 2009-090689 | A | 4/2009 |
| JP | 2009-244869 | A | 10/2009 |
| JP | 2011-033993 | A | 2/2011 |
| JP | 2012-015774 | A | 1/2012 |
| JP | 2013-525872 | A1 | 6/2013 |
| JP | 2014-500522 | A | 1/2014 |
| JP | 2015-191032 | A | 11/2015 |
| JP | 2016-502120 | A | 1/2016 |
| JP | 2016-85463 | A | 5/2016 |
| JP | 2016-516227 | A | 6/2016 |
| JP | 2017-153498 | | 9/2017 |
| JP | 2017-531840 | A | 10/2017 |
| JP | 6232763 | B2 | 11/2017 |
| JP | 6333965 | B2 | 5/2018 |
| KR | 2005-0010775 | A | 1/2005 |
| KR | 10-1372623 | B1 | 3/2014 |
| TW | 201219829 | A | 5/2012 |
| TW | 201803289 | A | 1/2018 |
| WO | 1991/000565 | A2 | 1/1991 |
| WO | 2000/030368 | A1 | 6/2000 |
| WO | 2002/071315 | A2 | 9/2002 |
| WO | 2004095248 | A | 11/2004 |
| WO | 2006132614 | A1 | 12/2006 |
| WO | 2007/037089 | A1 | 5/2007 |
| WO | 2007/085682 | A1 | 8/2007 |
| WO | 2007/102144 | A1 | 9/2007 |
| WO | 2008148927 | A1 | 12/2008 |
| WO | 2009/101238 | A1 | 8/2009 |
| WO | 2014203440 | A1 | 12/2010 |
| WO | 2012030787 | A2 | 3/2012 |
| WO | 2013/049012 | A1 | 4/2013 |
| WO | 2013062701 | A1 | 5/2013 |
| WO | 2014033306 | A1 | 3/2014 |
| WO | 2015/143641 | A1 | 10/2015 |
| WO | 2015143641 | A1 | 10/2015 |
| WO | 2016/054092 | A1 | 4/2016 |
| WO | 2017004695 | A1 | 1/2017 |
| WO | 2017044761 | A1 | 3/2017 |
| WO | 2017049163 | A1 | 3/2017 |
| WO | 2017120475 | A1 | 7/2017 |
| WO | 2017176861 | A1 | 10/2017 |
| WO | 2017/203201 | A1 | 11/2017 |
| WO | 2018008232 | A1 | 1/2018 |
| WO | 2018022523 | A1 | 2/2018 |
| WO | 2018/044537 | A1 | 3/2018 |
| WO | 2018039273 | A1 | 3/2018 |
| WO | 2018057564 | A1 | 3/2018 |
| WO | 2018085287 | A1 | 5/2018 |
| WO | 2018087408 | A1 | 5/2018 |
| WO | 2018097831 | A1 | 5/2018 |
| WO | 2018166921 | A1 | 9/2018 |
| WO | 2019148154 | A1 | 8/2019 |
| WO | 2020010226 | A1 | 1/2020 |

OTHER PUBLICATIONS

"Extended European Search Report dated Aug. 8, 2022", European Patent Application No. 19898874.3, (8 pages).
"Extended European Search Report dated Sep. 8, 2022", European Patent Application No. 20798769.4, (13 pages).
"Extended European Search Report dated Nov. 3, 2022", European Patent Application No. 20770244.0, (23 pages).
"First Examination Report dated Dec. 8, 2022", Australian Patent Application No. 2018392482, (3 pages).
"First Examination Report dated Jul. 27, 2022", Chinese Patent Application No. 201980036675.2, (5 pages).
"First Examination Report dated Jul. 28, 2022", Indian Patent Application No. 202047024232, (6 pages).
"First Office Action dated Sep. 16, 2022 with English translation", Chinese Patent Application No. 201980063642.7, (7 pages).
"FS_XR5G: Permanent document, v0.4.0", Qualcomm Incorporated, 3GPP TSG-SA 4 Meeting 103 retrieved from the Internet: URL:http://www.3gpp.org/ftp/Meetings%5F3GPP%5FSYNC/SA4/Docs/S4%2DI90526%2Ezip [retrieved on Apr. 12, 2019], Apr. 12, 2019, (98 pages).
"Non Final Office Action dated Dec. 7, 2022", U.S. Appl. No. 17/357,795, (63 pages).
"Non Final Office Action dated Sep. 19, 2022", U.S. Appl. No. 17/263,001, (14 pages).
"Notice of Reason for Rejection dated Oct. 28, 2022 with English translation", Japanese Patent Application No. 2020-531452, (3 pages).
"Office Action dated Nov. 24, 2022 with English Translation", Japanese Patent Application No. 2020-533730, (11 pages).
"Second Office Action dated Jul. 13, 2022 with English Translation", Chinese Patent Application No. 201880079474.6, (10 pages).
"Second Office Action dated Jun. 20, 2022 with English Translation", Chinese Patent Application No. 201880089255.6, (14 pages).
Anonymous, "Koi Pond: Top iPhone App Store Paid App", https://web.archive.org/web/20080904061233/https://www.iphoneincanada.ca/reviews/koi-pond-top-iphone-app-store-paid-app/—[retrieved on Aug. 9, 2022], (2 pages).
Chittineni, C., et al., "Single filters for combined image geometric manipulation and enhancement", Proceedings of SPIE vol. 1903, Image and Video Processing, Apr. 8, 1993, San Jose, CA. (Year: 1993), pp. 111-121.
Final Office Action dated Feb. 3, 2022, U.S. Appl. No. 16/864,721, (36 pages).
Non Final Office Action dated Feb. 2, 2022, U.S. Appl. No. 16/783,866, (8 pages).
"ARToolKit: Hardware", https://web.archive.org/web/20051013062315/http://www.hitl.washington.edu:80/artoolkit/documentation/hardware.htm (downloaded Oct. 26, 2020), Oct. 13, 2015, (3 pages).
Communication Pursuant to Article 94(3) EPC dated Sep. 4, 2019, European Patent Application No. 10793707.0, (4 pages).
Communication Pursuant to Article 94(3) EPC dated Jan. 4, 2022, European Patent Application No. 20154070.5, (8 pages).
Communication Pursuant to Article 94(3) EPC dated Oct. 21, 2021, European Patent Application No. 16207441.3, (4 pages).
Communication Pursuant to Rule 164(1) EPC dated Jul. 27, 2021, European Patent Application No. 19833664.6, (11 pages).
European Search Report dated Oct. 15, 2020, European Patent Application No. 20180623.9, (10 pages).
Examination Report dated Jun. 19, 2020, European Patent Application No. 20154750.2, (10 pages).
Extended European Search Report dated May 20, 2020, European Patent Application No. 20154070.5, (7 pages).

(56) References Cited

OTHER PUBLICATIONS

Extended European Search Report dated Jan. 22, 2021, European Patent Application No. 18890390.0, (11 pages).
Extended European Search Report dated Nov. 3, 2020, European Patent Application No. 18885707.2, (7 pages).
Extended European Search Report dated Jun. 30, 2021, European Patent Application No. 19811971.1, (9 pages).
Extended European Search Report dated Mar. 4, 2021, European Patent Application No. 19768418.6, (9 pages).
Extended European Search Report dated Nov. 4, 2020, European Patent Application No. 20190980.1, (14 pages).
Extended European Search Report dated Jun. 12, 2017, European Patent Application No. 16207441.3, (8 pages).
Extended European Search Report dated Jan. 4, 2022, European Patent Application No. 19815085.6, (9 pages).
Extended European Search Report dated Jul. 16, 2021, European Patent Application No. 19810142.0, (14 pages).
Extended European Search Report dated Jul. 30, 2021, European Patent Application No. 19839970.1, (7 pages).
Extended European Search Report dated Oct. 27, 2021, European Patent Application No. 19833664.6, (10 pages).
Extended European Search Report dated Sep. 20, 2021, European Patent Application No. 19851373.1, (8 pages).
Extended European Search Report dated Sep. 28, 2021, European Patent Application No. 19845418.3, (13 pages).
Final Office Action dated Aug. 10, 2020, U.S. Appl. No. 16/225,961, (13 pages).
Final Office Action dated Dec. 4, 2019, U.S. Appl. No. 15/564,517, (15 pages).
Final Office Action dated Feb. 19, 2020, U.S. Appl. No. 15/552,897, (17 pages).
Final Office Action dated Jun. 15, 2021, U.S. Appl. No. 16/928,313, (42 pages).
Final Office Action dated Mar. 1, 2021, U.S. Appl. No. 16/214,575, (29 pages).
Final Office Action dated Mar. 19, 2021, U.S. Appl. No. 16/530,776, (25 pages).
Final Office Action dated Nov. 24, 2020, U.S. Appl. No. 16/435,933, (44 pages).
Final Office Action dated Sep. 17, 2021, U.S. Appl. No. 16/938,782, (44 pages).
International Search Report and Written Opinion dated Feb. 12, 2021, International Application No. PCT/US20/60555, (25 pages).
International Search Report and Written Opinion dated Mar. 12, 2020, International PCT Patent Application No. PCT/US19/67919, (14 pages).
International Search Report and Written Opinion dated Aug. 15, 2019, International PCT Patent Application No. PCT/US19/33987, (20 pages).
International Search Report and Written Opinion dated Jun. 15, 2020, International PCT Patent Application No. PCT/US2020/017023, (13 pages).
International Search Report and Written Opinion dated Oct. 16, 2019, International PCT Patent Application No. PCT/US19/43097, (10 pages).
International Search Report and Written Opinion dated Oct. 16, 2019, International PCT Patent Application No. PCT/US19/36275, (10 pages).
International Search Report and Written Opinion dated Oct. 16, 2019, International PCT Patent Application No. PCT/US19/43099, (9 pages).
International Search Report and Written Opinion dated Jun. 17, 2016, International PCT Patent Application No. PCT/FI2016/050172, (9 pages).
International Search Report and Written Opinion dated Feb. 2, 2021, International PCT Patent Application No. PCT/US20/60550, (9 pages).
International Search Report and Written Opinion dated Oct. 22, 2019, International PCT Patent Application No. PCT/US19/43751, (9 pages).
International Search Report and Written Opinion dated Dec. 23, 2019, International PCT Patent Application No. PCT/US19/44953, (11 pages).
International Search Report and Written Opinion dated May 23, 2019, International PCT Patent Application No. PCT/US18/66514, (17 pages).
International Search Report and Written Opinion dated Sep. 26, 2019, International PCT Patent Application No. PCT/US19/40544, (12 pages).
International Search Report and Written Opinion dated Aug. 27, 2019, International PCT Application No. PCT/US2019/035245, (8 pages).
International Search Report and Written Opinion dated Dec. 27, 2019, International Application No. PCT/US19/47746, (16 pages).
International Search Report and Written Opinion dated Dec. 3, 2020, International Patent Application No. PCT/US20/43596, (25 pages).
International Search Report and Written Opinion dated Sep. 30, 2019, International Patent Application No. PCT/US19/40324, (7 pages).
International Search Report and Written Opinion dated Sep. 4, 2020, International Patent Application No. PCT/US20/31036, (13 pages).
International Search Report and Written Opinion dated Jun. 5, 2020, International Patent Application No. PCT/US20/19871, (9 pages).
International Search Report and Written Opinion dated Aug. 8, 2019, International PCT Patent Application No. PCT/US2019/034763, (8 pages).
International Search Report and Written Opinion dated Oct. 8, 2019, International PCT Patent Application No. PCT/US19/41151, (7 pages).
International Search Report and Written Opinion dated Jan. 9, 2020, International Application No. PCT/US19/55185, (10 pages).
International Search Report and Written Opinion dated Feb. 28, 2019, International Patent Application No. PCT/US18/64686, (8 pages).
International Search Report and Written Opinion dated Feb. 7, 2020, International PCT Patent Application No. PCT/US2019/061265, (11 pages).
International Search Report and Written Opinion dated Jun. 11, 2019, International PCT Application No. PCT/US19/22620, (7 pages).
Invitation to Pay Additional Fees mailed Aug. 15, 2019, International PCT Patent Application No. PCT/US19/36275, (2 pages).
Invitation to Pay Additional Fees mailed Sep. 24, 2020, International Patent Application No. PCT/US2020/043596, (3 pages).
Invitation to Pay Additional Fees mailed on Oct. 22, 2019, International PCT Patent Application No. PCT/US19/47746, (2 pages).
Invitation to Pay Additional Fees mailed on Apr. 3, 2020, International Patent Application No. PCT/US20/17023, (2 pages).
Invitation to Pay Additional Fees mailed on Oct. 17, 2019, International PCT Patent Application No. PCT/US19/44953, (2 pages).
"Multi-core processor", TechTarget, 2013, (1 page).
Non Final Office Action dated Aug. 21, 2019, U.S. Appl. No. 15/564,517, (14 pages).
Non Final Office Action dated Aug. 4, 2021, U.S. Appl. No. 16/864,721, (51 pages).
Non Final Office Action dated Jan. 26, 2021, U.S. Appl. No. 16/928,313, (33 pages).
Non Final Office Action dated Jan. 27, 2021, U.S. Appl. No. 16/225,961, (15 pages).
Non Final Office Action dated Jul. 27, 2020, U.S. Appl. No. 16/435,933, (16 pages).
Non Final Office Action dated Jul. 9, 2021, U.S. Appl. No. 17/002,663, (43 pages).
Non Final Office Action dated Jul. 9, 2021, U.S. Appl. No. 16/833,093, (47 pages).
Non Final Office Action dated Jun. 10, 2021, U.S. Appl. No. 16/938,782, (40 Pages).
Non Final Office Action dated Jun. 17, 2020, U.S. Appl. No. 16/682,911, (22 pages).
Non Final Office Action dated Jun. 19, 2020, U.S. Appl. No. 16/225,961, (35 pages).

(56) References Cited

OTHER PUBLICATIONS

Non Final Office Action dated Jun. 29, 2021, U.S. Appl. No. 16/698,588, (58 pages).
Non Final Office Action dated Mar. 3, 2021, U.S. Appl. No. 16/427,337, (41 pages).
Non Final Office Action dated May 26, 2021, U.S. Appl. No. 16/214,575, (19 pages).
Non Final Office Action dated Nov. 19, 2019, U.S. Appl. No. 16/355,611, (31 pages).
Non Final Office Action dated Nov. 5, 2020, U.S. Appl. No. 16/530,776, (45 pages).
Non Final Office Action dated Oct. 22, 2019, U.S. Appl. No. 15/859,277, (15 pages).
Non Final Office Action dated Sep. 1, 2020, U.S. Appl. No. 16/214,575, (40 pages).
Non Final Office Action dated Sep. 20, 2021, U.S. Appl. No. 17/105,848, (56 pages).
Non Final Office Action dated Sep. 29, 2021, U.S. Appl. No. 16/748,193, (62 pages).
Notice of Allowance dated Mar. 25, 2020, U.S. Appl. No. 15/564,517, (11 pages).
Notice of Allowance dated Oct. 5, 2020, U.S. Appl. No. 16/682,911, (27 pages).
Notice of Reason of Refusal dated Sep. 11, 2020 with English translation, Japanese Patent Application No. 2019-140435, (6 pages).
"Phototourism Challenge", CVPR 2019 Image Matching Workshop. https://image matching-workshop. github.io., (16 pages).
"Summons to attend oral proceedings pursuant to Rule 115(1) EPC dated Jul. 15, 2019", European Patent Application No. 15162521.7, (7 pages).
Aarik, J., et al., "Effect of crystal structure on optical properties of TiO2 films grown by atomic layer deposition", Thin Solid Films; Publication [online]. May 19, 1998 [retrieved Feb. 19, 2020]. Retrieved from the Internet: <URL: https://www.sciencedirect.com/science/article/pii/S0040609097001351?via%3Dihub>; DOI: 10.1016/S0040-6090(97)00135-1; see entire document, (2 pages).
Altwaijry, et al., "Learning to Detect and Match Keypoints with Deep Architectures", Proceedings of the British Machine Vision Conference (BMVC), BMVA Press, Sep. 2016, [retrieved on Jan. 8, 2021 (Jan. 8, 2021)] < URL: http://www.bmva.org/bmvc/2016/papers/paper049/index.html >, en lire document, especially Abstract.
Arandjelović, Relja, et al., "Three things everyone should know to improve object retrieval", CVPR, 2012, (8 pages).
Azom, "Silica—Silicon Dioxide (SiO2)", AZO Materials; Publication [Online]. Dec. 13, 2001 [retrieved Feb. 19, 2020]. Retrieved from the Internet: <URL: https://www.azom.com/article.aspx?ArticleID=1114>.
Azuma, Ronald T., "A Survey of Augmented Reality", Presence: Teleoperators and Virtual Environments 6, 4 (Aug. 1997), 355-385; https://web.archive.org/web/20010604100006/http://www.cs.unc.edu/~azuma/ARpresence.pdf (downloaded Oct. 26, 2020).
Azuma, Ronald T., "Predictive Tracking for Augmented Reality", Department of Computer Science, Chapel Hill NC; TR95-007, Feb. 1995, 262 pages.
Battaglia, Peter W, et al., "Relational inductive biases, deep learning, and graph networks", arXiv:1806.01261, Oct. 17, 2018, pp. 1-40.
Berg, Alexander C, et al., "Shape matching and object recognition using low distortion correspondences", In CVPR, 2005, (8 pages).
Bian, Jiawang, et al., "GMS: Grid-based motion statistics for fast, ultra-robust feature correspondence.", In CVPR (Conference on Computer Vision and Pattern Recognition), 2017, (10 pages).
Bimber, Oliver, et al., "Spatial Augmented Reality: Merging Real and Virtual Worlds", https://web.media.mit.edu/~raskar/book/BimberRaskarAugmentedRealityBook.pdf; published by A K Peters/CRC Press (Jul. 31, 2005); eBook (3rd Edition, 2007), (393 pages).
Brachmann, Eric, et al., "Neural-Guided RANSAC: Learning Where to Sample Model Hypotheses", In ICCV (International Conference on Computer Vision ), arXiv:1905.04132v2 [cs.CV] Jul. 31, 2019, (17 pages).
Butail, et al., "Putting the fish in the fish tank: Immersive VR for animal behavior experiments", In: 2012 IEEE International Conference on Robotics and Automation. May 18, 2012 (May 18, 2012) Retrieved on Nov. 14, 2020 (Nov. 14, 2020) from <http://lcdcl.umd.edu/papers/icra2012.pdf> entire document.
Caetano, Tibério S, et al., "Learning graph matching", IEEE TPAMI, 31(6):1048-1058, 2009.
Cech, Jan, et al., "Efficient sequential correspondence selection by cosegmentation", IEEE TPAMI, 32(9):1568-1581, Sep. 2010.
Cuturi, Marco, "Sinkhorn distances: Lightspeed computation of optimal transport", NIPS, 2013, (9 pages).
Dai, Angela, et al., "ScanNet: Richly-annotated 3d reconstructions of indoor scenes", In CVPR, arXiv:1702.04405v2 [cs.CV] Apr. 11, 2017, (22 pages).
Deng, Haowen, et al., "PPFnet: Global context aware local features for robust 3d point matching", In CVPR, arXiv:1802.02669v2 [cs.CV] Mar. 1, 2018, (12 pages).
Detone, Daniel, et al., "Deep image homography estimation", In RSS Work-shop: Limits and Potentials of Deep Learning in Robotics, arXiv:1606.03798v1 [cs.CV] Jun. 13, 2016, (6 pages).
Detone, Daniel, et al., "Self-improving visual odometry", arXiv:1812.03245, Dec. 8, 2018, (9 pages).
Detone, Daniel, et al., "SuperPoint: Self-supervised interest point detection and description", In CVPR Workshop on Deep Learning for Visual SLAM, arXiv:1712.07629v4 [cs.CV] Apr. 19, 2018, (13 pages).
Dusmanu, Mihai, et al., "D2-net: A trainable CNN for joint detection and description of local features", CVPR, arXiv:1905.03561v1 [cs.CV] May 9, 2019, (16 pages).
Ebel, Patrick, et al., "Beyond cartesian representations for local descriptors", ICCV, arXiv:1908.05547v1 [cs.CV] Aug. 15, 2019, (11 pages).
Fischler, Martin A, et al., "Random sample consensus: a paradigm for model fitting with applications to image analysis and automated cartography", Communications of the ACM, 24(6): 1981, pp. 381-395.
Gilmer, Justin, et al., "Neural message passing for quantum chemistry", In ICML, arXiv:1704.01212v2 [cs.LG] Jun. 12, 2017, (14 pages).
Giuseppe, Donato, et al., "Stereoscopic helmet mounted system for real time 3D environment reconstruction and indoor ego—motion estimation", Proc. SPIE 6955, Head- and Helmet-Mounted Displays XIII: Design and Applications, 69550P.
Goodfellow, "Titanium Dioxide—Titania (TiO2)", AZO Materials; Publication [online]. Jan. 11, 2002 [retrieved Feb. 19, 2020]., Retrieved from the Internet: <URL: https://www.azom.com/article.aspx?ArticleID=1179>.
Hartley, Richard, et al., "Multiple View Geometry in Computer Vision", Cambridge University Press, 2003, pp. 1-673.
Jacob, Robert J.K., "Eye Tracking in Advanced Interface Design", Human-Computer Interaction Lab, Naval Research Laboratory, Washington, D.C., date unknown. 2003, pp. 1-50.
Lee, et al., "Self-Attention Graph Pooling", Cornell University Library/Computer Science/Machine Learning, Apr. 17, 2019 [retrieved on Jan. 8, 2021 from the Internet< URL: https://arxiv.org/abs/1904.08082 >, entire document.
Lee, Juho, et al., "Set transformer: A frame-work for attention-based permutation-invariant neural networks", ICML, arXiv:1810.00825v3 [cs.LG] May 26, 2019, (17 pages).
Leordeanu, Marius, et al., "A spectral technique for correspondence problems using pairwise constraints", Proceedings of (ICCV) International Conference on Computer Vision, vol. 2, pp. 1482-1489, Oct. 2005, (8 pages).
Levola, T., "Diffractive Optics for Virtual Reality Displays", Journal of the SID Eurodisplay 14/05, 2005, XP008093627, chapters 2-3, Figures 2 and 10, pp. 467-475.
Levola, Tapani, "Invited Paper: Novel Diffractive Optical Components for Near to Eye Displays—Nokia Research Center", SID 2006 Digest, 2006 SID International Symposium, Society for Information Display, vol. XXXVII, May 24, 2005, chapters 1-3, figures 1 and 3, pp. 64-67.

(56) References Cited

OTHER PUBLICATIONS

Li, Yujia, et al., "Graph matching networks for learning the similarity of graph structured objects", ICML, arXiv:1904.12787v2 [cs.LG] May 12, 2019, (18 pages).
Li, Zhengqi, et al., "Megadepth: Learning single-view depth prediction from internet photos", In CVPR, fromarXiv: 1804.00607v4 [cs.CV] Nov. 28, 2018, (10 pages).
Libovicky, et al., "Input Combination Strategies for Multi-Source Transformer Decoder", Proceedings of the Third Conference on Machine Translation (WMT). vol. 1: Research Papers, Belgium, Brussels, Oct. 31-Nov. 1, 2018; retrieved on Jan. 8, 2021 (Jan. 8, 2021 ) from < URL: https://doi.org/10.18653/v1/W18-64026 >, entire document.
Loiola, Eliane Maria, et al., "A survey for the quadratic assignment problem", European journal of operational research, 176(2): 2007, pp. 657-690.
Lowe, David G, "Distinctive image features from scale-invariant keypoints", International Journal of Computer Vision, 60(2): 91-110, 2004, (28 pages).
Luo, Zixin, et al., "ContextDesc: Local descriptor augmentation with cross-modality context", CVPR, arXiv:1904.04084v1 [cs.CV] Apr. 8, 2019, (14 pages).
Memon, F., et al., "Synthesis, Characterization and Optical Constants of Silicon Oxycarbide", EPJ Web of Conferences; Publication [online]. Mar. 23, 2017 [retrieved Feb. 19, 2020).<URL: https://www.epj-conferences.org/articles/epjconf/pdf/2017/08/epjconf_nanop2017_00002.pdf>; DOI: 10.1051/epjconf/201713900002, (8 pages).
Molchanov, Pavlo, et al., "Short-range FMCW monopulse radar for hand-gesture sensing", 2015 IEEE Radar Conference (RadarCon) (2015), pp. 1491-1496.
Mrad, et al., "A framework for System Level Low Power Design Space Exploration", 1991.
Munkres, James, "Algorithms for the assignment and transportation problems", Journal of the Society for Industrial and Applied Mathematics, 5(1): 1957, pp. 32-38.
Ono, Yuki, et al., "LF-Net: Learning local features from images", 32nd Conference on Neural Information Processing Systems (NIPS 2018), arXiv:1805.09662v2 [cs.CV] Nov. 22, 2018, (13 pages).
Paszke, Adam, et al., "Automatic differentiation in Pytorch", 31st Conference on Neural Information Processing Systems (NIPS 2017), Long Beach, CA, USA, (4 pages).
Peyré, Gabriel, et al., "Computational Optimal Transport", Foundations and Trends in Machine Learning, 11(5-6):355-607, 2019; arXiv:1803.00567v4 [stat.ML] Mar. 18, 2020, (209 pages).
Qi, Charles Ruizhongtai, et al., "Pointnet++: Deep hierarchical feature learning on point sets in a metric space.", 31st Conference on Neural Information Processing Systems (NIPS 2017), Long Beach, CA, USA., (10 pages).
Qi, Charles R, et al., "Pointnet: Deep Learning on Point Sets for 3D Classification and Segmentation", CVPR, arXiv:1612.00593v2 [cs.CV] Apr. 10, 201, (19 pages).
Radenović, Filip, et al., "Revisiting Oxford and Paris: Large-Scale Image Retrieval Benchmarking", CVPR, arXiv:1803.11285v1 [cs.CV] Mar. 29, 2018, (10 pages).
Raguram, Rahul, et al., "A comparative analysis of ransac techniques leading to adaptive real-time random sample consensus", Computer Vision—ECCV 2008, 10th European Conference on Computer Vision, Marseille, France, Oct. 12-18, 2008, Proceedings, Part I, (15 pages).
Ranftl, René, et al., "Deep fundamental matrix estimation", European Conference on Computer Vision (ECCV), 2018, (17 pages).
Revaud, Jerome, et al., "R2D2: Repeatable and Reliable Detector and Descriptor", In NeurIPS, arXiv:1906.06195v2 [cs.CV] Jun. 17, 2019, (12 pages).
Rocco, Ignacio, et al., "Neighbourhood Consensus Networks", 32nd Conference on Neural Information Processing Systems (NeurIPS 2018), Montréal, Canada, arXiv:1810.10510v2 [cs.CV] Nov. 29, 2018, (20 pages).
Rublee, Ethan, et al., "ORB: An efficient alternative to SIFT or SURF", Proceedings of the IEEE International Conference on Computer Vision. 2564-2571. 2011; 10.1109/ICCV.2011.612654, (9 pages).
Sarlin, et al., "SuperGlue: Learning Feature Matching with Graph Neural Networks", Cornell University Library/Computer Science/Computer Vision and Pattern Recognition, Nov. 26, 2019 [retrieved on Jan. 8, 2021 from the Internet< URL: https://arxiv.org/abs/1911.11763 >, entire document.
Sattler, Torsten, et al., "SCRAMSAC: Improving RANSAC's efficiency with a spatial consistency filter", ICCV, 2009: 2090-2097., (8 pages).
Schonberger, Johannes Lutz, et al., "Pixelwise view selection for un-structured multi-view stereo", Computer Vision—ECCV 2016: 14th European Conference, Amsterdam, The Netherlands, Oct. 11-14, 2016, Proceedings, Part III , pp. 501-518, 2016.
Schonberger, Johannes Lutz, et al., "Structure-from-motion revisited", Proceedings of the IEEE Conference on Computer Vision and Pattern Recognition (CVPR), 2016, pp. 4104-4113, (11 pages).
Sheng, Liu, et al., "Time-multiplexed dual-focal plane head-mounted display with a liquid lens", Optics Letters, Optical Society of Amer i ca, US, vol. 34, No. 11, Jun. 1, 2009 (Jun. 1, 2009), XP001524475, ISSN: 0146-9592, pp. 1642-1644.
Sinkhorn, Richard, et al., "Concerning nonnegative matrices and doubly stochastic matrices.", Pacific Journal of Mathematics, 1967, pp. 343-348.
Spencer, T., et al., "Decomposition of poly(propylene carbonate) with UV sensitive iodonium 11 salts", Polymer Degradation and Stability; [online]. Dec. 24, 2010 (retrieved Feb. 19, 2020]., (17 pages).
Tanriverdi, Vildan, et al., "Interacting With Eye Movements in Virtual Environments", Department of Electrical Engineering and Computer Science, Tufts University; Proceedings of the SIGCHI conference on Human Factors in Computing Systems, Apr. 2000, pp. 1-8.
Thomee, Bart, et al., "YFCC100m: The new data in multimedia research", Communications of the ACM, 59(2):64-73, 2016; arXiv:1503.01817v2 [cs.MM] Apr. 25, 2016, (8 pages).
Torresani, Lorenzo, et al., "Feature correspondence via graph matching: Models and global optimization", Computer Vision—ECCV 2008, 10th European Conference on Computer Vision, Marseille, France, Oct. 12-18, 2008, Proceedings, Part II, (15 pages).
Tuytelaars, Tinne, et al., "Wide baseline stereo matching based on local, affinely invariant regions", BMVC, 2000, pp. 1-14.
Ulyanov, Dmitry, et al., "Instance normalization: The missing ingredient for fast stylization", arXiv:1607.08022v3 [cs.CV] Nov. 6, 2017, (6 pages).
Vaswani, Ashish, et al., "Attention is all you need", 31st Conference on Neural Information Processing Systems (NIPS 2017), Long Beach, CA, USA; arXiv:1706.03762v5 [cs.CL] Dec. 6, 2017, (15 pages).
Veličković, Petar, et al., "Graph attention networks", ICLR, arXiv:1710.10903v3 [stat.ML] Feb. 4, 2018, (12 pages).
Mllani, Cédric, "Optimal transport: old and new", vol. 338. Springer Science & Business Media, Jun. 2008, pp. 1-998.
Wang, Xiaolong, et al., "Non-local neural networks", CVPR, arXiv:1711.07971v3 [cs.CV] Apr. 13, 2018, (10 pages).
Wang, Yue, et al., "Deep Closest Point: Learning representations for point cloud registration", ICCV, arXiv:1905.03304v1 [cs.CV] May 8, 2019, (10 pages).
Wang, Yue, et al., "Dynamic Graph CNN for learning on point clouds", ACM Transactions on Graphics, arXiv:1801.07829v2 [cs.CV] Jun. 11, 2019, (13 pages).
Weissel, et al., "Process cruise control: event-driven clock scaling for dynamic power management", Proceedings of the 2002 international conference on Compilers, architecture, and synthesis for embedded systems. Oct. 11, 2002 (Oct. 11, 2002) Retrieved on May 16, 2020 (May 16, 2020) from <URL: https://dl.acm.org/doi/pdf/10.1145/581630.581668>.
Yi, Kwang Moo, et al., "Learning to find good correspondences", CVPR, arXiv:1711.05971v2 [cs.CV] May 21, 2018, (13 pages).
Yi, Kwang Moo, et al., "Lift: Learned invariant feature transform", ECCV, arXiv:1603.09114v2 [cs.CV] Jul. 29, 2016, (16 pages).

(56) References Cited

OTHER PUBLICATIONS

Zaheer, Manzil, et al., "Deep Sets", 31st Conference on Neural Information Processing Systems (NIPS 2017), Long Beach, CA, USA; arXiv:1703.06114v3 [cs.LG] Apr. 14, 2018, (29 pages).
Zhang, Jiahui, et al., "Learning two-view correspondences and geometry using order-aware network", ICCV; aarXiv:1908.04964v1 [cs.CV] Aug. 14, 2019, (11 pages).
Zhang, Li, et al., "Dual graph convolutional net-work for semantic segmentation", BMVC, 2019; arXiv:1909.06121v3 [cs.CV] Aug. 26, 2020, (18 pages).
"Communication according to Rule 164(1) EPC dated Feb. 23, 2022", European Patent Application No. 20753144.3, (11 pages).
"Communication Pursuant to Article 94(3) EPC dated Apr. 25, 2022", European Patent Application No. 18885707.2, (5 pages).
"Communication Pursuant to Article 94(3) EPC dated May 30, 2022", European Patent Application No. 19768418.6, (6 pages).
"Extended European Search Report dated Jan. 28, 2022", European Patent Application No. 19815876.8, (9 pages).
"Extended European Search Report dated Jun. 19, 2020", European Patent Application No. 20154750.2, (10 pages).
"Extended European Search Report dated Mar. 22, 2022", European Patent Application No. 19843487.0, (14 pages).
"Extended European Search Report dated May 16, 2022", European Patent Application No. 19871001.4, (9 pages).
"Extended European Search Report dated May 30, 2022", European Patent Application No. 20753144.3, (10 pages).
"Final Office Action dated Feb. 23, 2022", U.S. Appl. No. 16/748,193, (23 pages).
"Final Office Action dated Jul. 13, 2022", U.S. Appl. No. 17/262,991, (18 pages).
"First Examination Report dated May 13, 2022", Indian Patent Application No. 202047026359, (8 pages).
"First Office Action dated Mar. 14, 2022 with English translation", Chinese Patent Application No. 201880079474.6, (11 pages).
"Non Final Office Action dated Apr. 1, 2022", U.S. Appl. No. 17/256,961, (65 pages).
"Non Final Office Action dated Apr. 11, 2022", U.S. Appl. No. 16/938,782, (52 pages).
"Non Final Office Action dated Apr. 12, 2022", U.S. Appl. No. 17/262,991, (60 pages).
"Non Final Office Action dated Jul. 26, 2022", U.S. Appl. No. 17/098,059, (28 pages).
"Non Final Office Action dated Mar. 31, 2022", U.S. Appl. No. 17/257,814, (60 pages).
"Non Final Office Action dated Mar. 9, 2022", U.S. Appl. No. 16/870,676, (57 pages).
"Non Final Office Action dated May 10, 2022", U.S. Appl. No. 17/140,921, (25 pages).
"Non Final Office Action dated May 17, 2022", U.S. Appl. No. 16/748,193, (11 pages).
"Decision of Rejection dated Jan. 5, 2023 with English translation", Chinese Patent Application No. 201880079474.6, (10 pages).
"Extended European Search Report dated Dec. 14, 2022", European Patent Application No. 20886547.7, (8 pages).
"Final Office Action dated Dec. 29, 2022", U.S. Appl. No. 17/098,059, (32 pages).
"Final Office Action dated Mar. 10, 2023", U.S. Appl. No. 17/357,795, (15 pages).
"First Office Action dated Dec. 22, 2022 with English translation", Chinese Patent Application No. 201980061450.2, (11 pages).
"First Office Action dated Jan. 24, 2023 with English translation", Japanese Patent Application No. 2020-549034, (7 pages).
"First Office Action dated Jan. 30, 2023 with English translation", Chinese Patent Application No. 201980082951.9, (5 pages).
"First Office Action dated Mar. 27, 2023 with English translation", Japanese Patent Application No. 2020-566617, (6 pages).
"First Office Action dated Mar. 6, 2023 with English translation", Korean Patent Application No. 10-2020-7019685, (7 pages).
"Non Final Office Action dated Apr. 13, 2023", U.S. Appl. No. 17/098,043, (7 pages).
"Non Final Office Action dated Feb. 3, 2023", U.S. Appl. No. 17/497,965, (32 pages).
"Non Final Office Action dated Jan. 24, 2023", U.S. Appl. No. 17/497,940, (10 pages).
"Non Final Office Action dated Mar. 1, 2023", U.S. Appl. No. 18/046,739, (34 pages).
"Extended European Search Report dated Apr. 5, 2023", European Patent Application No. 20888716.6, (11 pages).
"First Office Action dated Apr. 21, 2023 with English translation", Japanese Patent Application No. 2021-509779, (26 pages).
"First Office Action dated Apr. 13, 2023 with English Translation", Japanese Patent Application No. 2020-567766, (7 pages).
"Non Final Office Action dated May 11, 2023", U.S. Appl. No. 17/822,279, (24 pages).
"Office Action dated Apr. 13, 2023 with English translation", Japanese Patent Application No. 2020-533730, (13 pages).
"Office Action dated Mar. 30, 2023 with English translation", Japanese Patent Application No. 2020-566620, (10 bages).
Li, Yujia, et al., "Graph Matching Networks for Learning the Similarity of Graph Structured Objects", ARXIV.ORG, Cornell University Library, 201 Olin Library Cornell University Ithaca, NY 14853, XP081268608, Apr. 29, 2019.
Luo, Zixin, et al., "ContextDesc: Local Descriptor Augmentation With Cross-Modality Context", 2019 IEEE/CVF Conference on Computer Vision and Pattern Recognition (CCPR), IEEE, XP033686823, DOI: 10.1109/CVPR.2019.00263 [retrieved on Jan. 8, 2020], Jun. 15, 2019, pp. 2522-2531.
Zhang, Zen, et al., "Deep Graphical Feature Learning for the Feature Matching Problem", 2019 IEEE/CVF International Conference on Computer Vision (ICCV), IEEE, XP033723985, DOI: 10.1109/ICCV.2019.00519 [retrieved on Feb. 24, 2020], Oct. 27, 2019, pp. 5086-5095.
"First Office Action dated May 20, 2023 with English translation", Japanese Patent Application No. 2021-519873, (8 pages).
"First Office Action dated May 26, 2023 with English translation", Japanese Patent Application No. 2021-500607, (6 pages).
"Non Final Office Action dated Jun. 14, 2023", U.S. Appl. No. 17/516,483, (10 pages).

* cited by examiner

REGISTRATION OF LOCAL CONTENT BETWEEN FIRST AND SECOND AUGMENTED REALITY VIEWERS

CROSS-REFERENCE TO RELATED APPLICATIONS

This application is a National Phase of International Application No. PCT/US2020/019871, filed on Feb. 26, 2020, which claims priority from U.S. Provisional Patent Application No. 62/817,318, filed on Mar. 12, 2019 and U.S. Provisional Patent Application No. 62/836,417, filed on Apr. 19, 2019, each of which is incorporated herein by reference in their entirety.

BACKGROUND OF THE INVENTION

1). Field of the Invention

This invention relates to a viewing system having first and second augmented reality viewers and registration of local content for viewing by the viewers.

2). Discussion of Related Art

Modern computing and display technology has facilitated the development of user interaction systems that include "augmented reality" viewers. Such a viewer usually has a head unit with a head-mountable frame that a user can secure to their head and frequently includes two waveguides, one in front of each eye of the user. The waveguides are transparent so that ambient light from real-world objects can transmit through the waveguides and the user can see the real-world objects. Each waveguide also serves to transmit projected light from a projector to a respective eye of the user. The projected light forms an image on the retina of the eye. The retina of the eye thus receives the ambient light and the projected light. The user simultaneously sees real-world objects and one or more virtual objects that are created by the projected light.

In this manner, a user can see a rendering of local content within the real world. Two users within a room will each have their own local content displayed to them. It may sometimes be required that two users see the same local content in the same location. Two users may, for example, wish to see the same local content in the same location when they collaborate over a project, play a game, join in the watching of a sports event, etc.

SUMMARY OF THE INVENTION

The invention provides a viewing system including a first augmented reality viewer that includes a first display that permits a first user to see real world objects, a first data source to hold image data of local content, a first projector to display the image data of local content through the first display to the first user while the first user views the real world objects, a first processor, a first computer-readable medium connected to the first processor, a first set of vision data and algorithms on the first computer-readable medium and executable by the processor, including a first device coordinate frame (DCF) a first registration marker operable by the first user to select a first feature point (FP1) and a second feature point (FP2) on at least one of the real word objects, a first uniform coordinate system (UCS) alignment module having a first feature point storing module that stores locations of the first registration marker when selecting the FP1 and the FP2, a first user coordinate frame calculator determining a first user coordinate frame (UCF) based on the locations of the first registration marker when selecting the FP1 and the FP2, a first transformer to transform the first DCF to the first UCF and a first render engine that displays the image data of local content on the first data source based on the transformation from the first DCF to the first UCF.

The invention also provides a method of viewing image data of local content including creating a first augmented reality view including storing a first device coordinate frame (DCF) on a first computer-readable medium, moving, by the first user, a first registration marker to select a first feature point (FP1) and a second feature point (FP2) on at least one the real word object viewable by the user through a first display, executing a first uniform coordinate system (UCS) alignment module by: storing locations of the first registration marker when selecting the FP1 and the FP2, determining a first user coordinate frame (UCF) based on the locations of the first registration marker when selecting the FP1 and the FP2, transforming the first DCF to the first UCF and displaying image data of local content received on a first data source with first projector through the first display to the first user while the first user views the real world objects based on the transformation from the first DCF to the first UCF.

BRIEF DESCRIPTION OF THE DRAWINGS

The invention is further described by way of example with reference to the accompanying drawings, wherein.

DETAILED DESCRIPTION OF THE INVENTION

Figure 1:
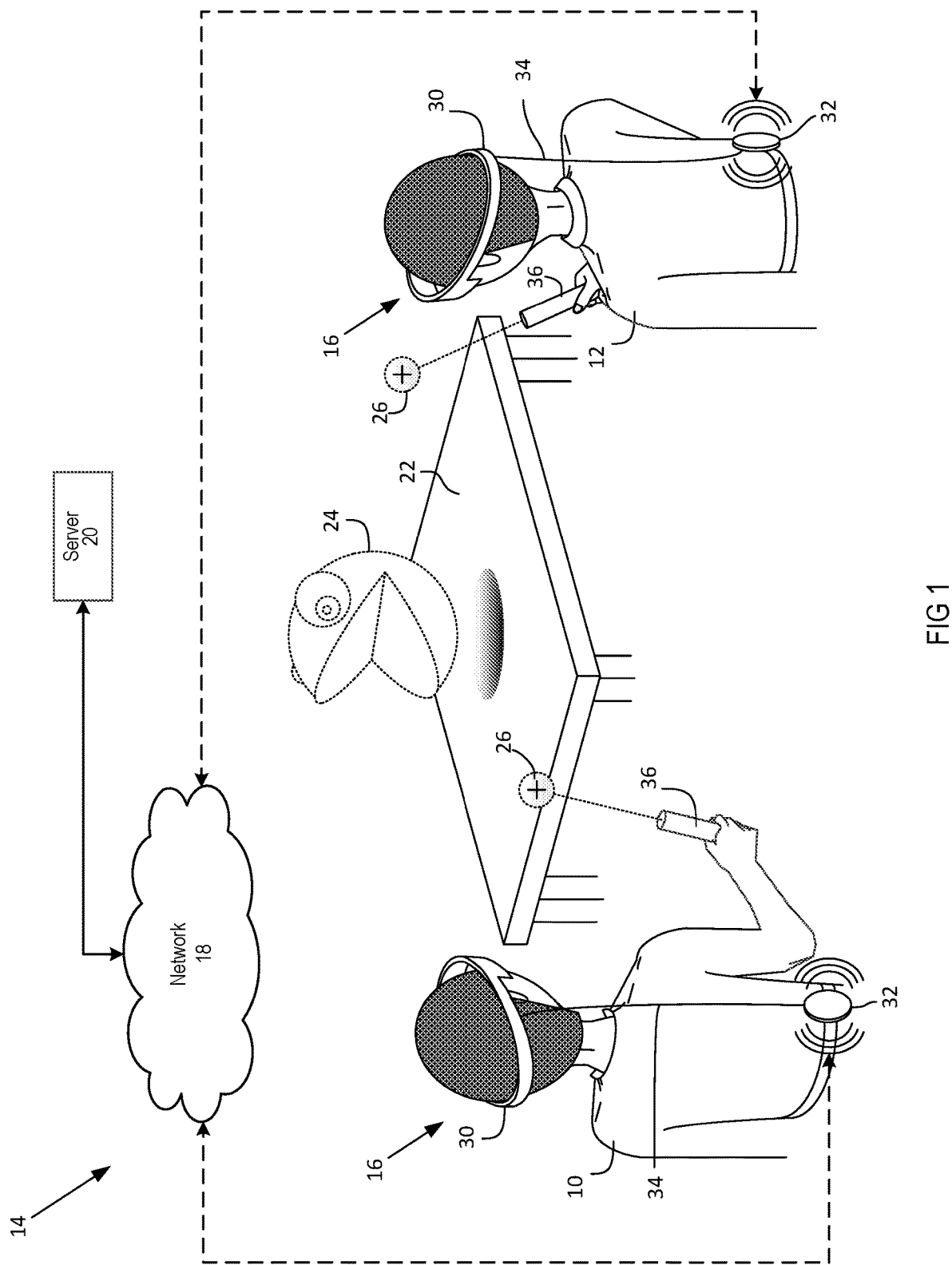
FIG. 1 is a perspective view of a viewing system, according to an embodiment of the invention, that is being used by first and second users, together with a table and renderings that are only visible to the users.

FIG. 1 of the accompanying drawings illustrates first and second users 10 and 12 that interact with a viewing system 14, according to one or more embodiments of the invention. The viewing system 14 includes a respective augmented reality viewer 16 for each user 10 and 12, a network 18 and a server 20. The first and second users are located within an environment with a real object in the form of a table 22.

Various renderings are viewable by the users 10 and 12 using the augmented reality viewers 16, including a rendering of local content 24 and renderings of registration markers 26.

Each augmented reality viewer 16 includes a head unit 30, a belt pack 32, a cable connection 34, and a six degrees of freedom (6 dof) controller 36. The respective user 10 or 12 secures the head unit 30 to their head and the belt pack 32 remotely from the head unit 30 on their waist (or other suitable location, such as a backpack, for example). The cable connection 34 connects the head unit 30 to the belt pack 32. The head unit 30 includes technologies that are used to display a virtual object or objects to a user while the user is permitted to see real objects such as the table 22. The belt pack 32 includes primarily processing and communications capabilities of the augmented reality viewer 16. In another embodiment, the processing and communication capabilities may reside entirely in the head unit 30, thus dispensing the need for the belt pack 32. The belt pack 32 is connected via a wireless connection to the network 18. The server 20 is connected to the network 18 and holds data representative of local content. The belt pack 32 downloads the local content from the server 20 via the network 18. The belt pack 32 provides the data via the cable connection 34 to the head unit 30. The head unit 30 typically includes a display that includes a light source, which could be laser light or LED light or any other suitable light, and a waveguide that guides the light so that the light is received by a retina of each eye of the respective user 10 or 12. The display of the head unit 30 creates slightly different images for left and right eyes of the user 10 or 12 so that a brain of the user 10 or 12 perceives the light as a three-dimensional image of the local content 24. The proportions of the local content 24 and its location and distance from the user 10 or 12 are determined by the data representing local content 24 and various coordinate frames that are used to display the local content 24 to the respective user 10 or 12.

The local content 24 is displayed to both users 10 and 12 in the same location relative to the table 22. In the given example, the local content 24 is a head of a character that faces towards the first user 10 from the viewpoint of the first user 10 and from the viewpoint of the second user 12.

The 6 dof controller 36 includes a location transmitter and the head unit 30 includes a location receiver. The location transmitter transmits a location signal and the location receiver receives the location signal. The location signal includes data representing a location of the location transmitter, and therefore the 6 dof controller 36, relative to the location receiver and therefore the head unit 30.

In use, the user 10 or 12 mounts the head unit 30 to their head and the belt pack 32 to their waist. The belt pack 32 downloads image data over the network 18 from the server 20. The user 10 or 12 can see the table 22 through a display of the head unit 30. A projector forming part of the head unit 30 receives the image data from the belt pack 32 and generates light based on the image data. The light travels through one or more waveguides forming part of the display of the head unit 30. The light then leaves the waveguide and propagates on to a retina of an eye of the user 10 or 12. The projector generates the light in a pattern that is replicated on to a retina of the eye of the user 10 or 12. The light that falls on the retina of the eye of the user 10 or 12 has a selected field of depth so that the user 10 or 12 perceives an image at a preselected depth behind the waveguide. In addition, both eyes receive slightly different images so that a brain of the user 10 or 12 perceives a three-dimensional image or images at selected distances from the head unit 30. In the present example, both users 10 and 12 perceive the local content 24 as an augmentation to seeing the table 22.

Each user 10 or 12 can also perceive one of the registration markers 26 in three-dimensions. A location of a registration marker 26 is always in a set direction relative to the 6 dof controller 36 that is held by the respective user 10 or 12. The registration marker 26 thus moves left to right and forward and backward as the respective 6 dof controller 36 is moved left and right and forwards and backwards. The registration marker 26 attaches itself to a surface of a real object. When a user thus moves the 6 dof controller 36, the registration marker 26 may for example move across a surface of the table 22. The user 10 or 12 can then select particular points on the table 22, for example one or more corners of the table 22.

The local content 24 and the registration markers 26 are not visible from the perspective of the drawing and are only visible to the users 10 and 12 due their use of the augmented reality viewers 16. The local content 24 and the registration markers 26 are initially data structures that reside within vision data and algorithms in the belt pack 32. The data structures then manifest themselves as light when the projectors in the head units 30 generate light based on the data structures. Although the local content 24 and the registration markers 26 have no existence in three-dimensional space in front of the users 10 and 12 (e.g. are virtual objects), they are represented in FIG. 1 in three-dimensional space. The visualization of computer data in three-dimensional space is used throughout this description to illustrate how the data structures that facilitate the renderings that are perceived by the users 10 and 12 related to one another within the data structures of the vision algorithms in the belt pack 32.

Figure 2:
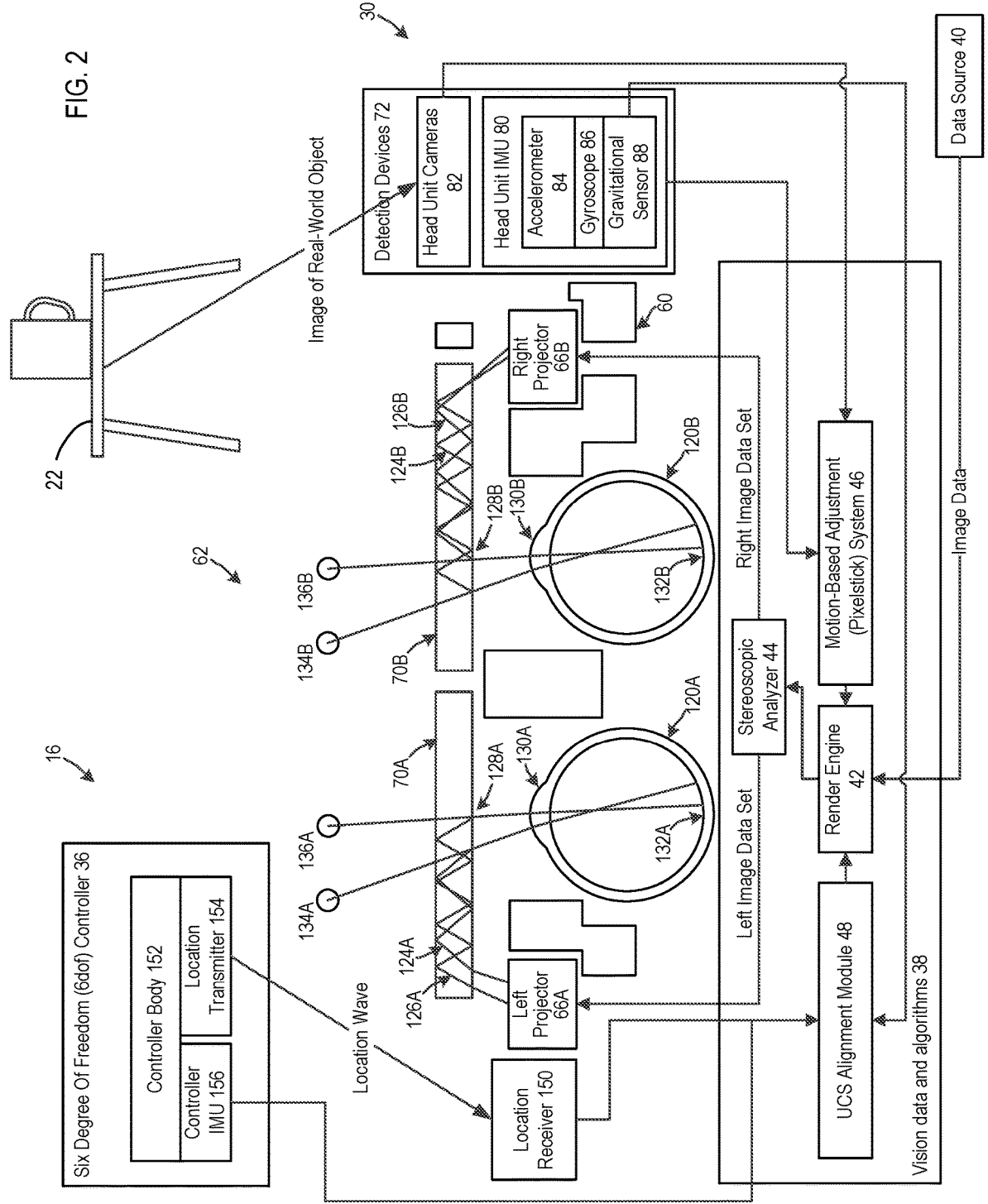
FIG. 2 is a schematic diagram that shows components of an augmented reality viewer and eyes of one user in cross-sectional plan view, further components of the augmented reality viewer in block diagram form, and a table inside view.

FIG. 2 illustrates one of the augmented reality viewers 16 in more detail, including the head unit 30, the 6 dof controller 36, and vision data and algorithms 38. In some embodiments, the vision data and algorithms 38 reside primarily with the belt pack 32 in FIG. 1. In other embodiments, the vision data and algorithms 38 may reside entirely within a head unit or may be split between a head unit and a belt pack.

FIG. 2 further includes a data source 40. In the present example, the data source 40 includes image data that is received from the server 20 in FIG. 1 and then stored on a storage device of the belt pack 32. The image data may, for example, be three-dimensional image data that can be used to render the local content 24. The image data may be time sequenced data that allows for the creation of a video that moves in two- or three-dimensions in a predefined or non-predefined sequence, and may be located on a real-world object such as the table 22 in FIG. 1.

The vision data and algorithms 38 include a render engine 42, a stereoscopic analyzer 44, a motion-based adjustment (Pixelstick) system 46, and a uniform coordinate system (UCS) alignment module 48.

The render engine 42 is connected to the data source 40, the motion-based adjustment system 46, and the UCS alignment module 48. The render engine 42 is capable of receiving inputs from various systems, in the present example the motion-based adjustment system 46 and the UCS alignment module 48.

Figure 3:
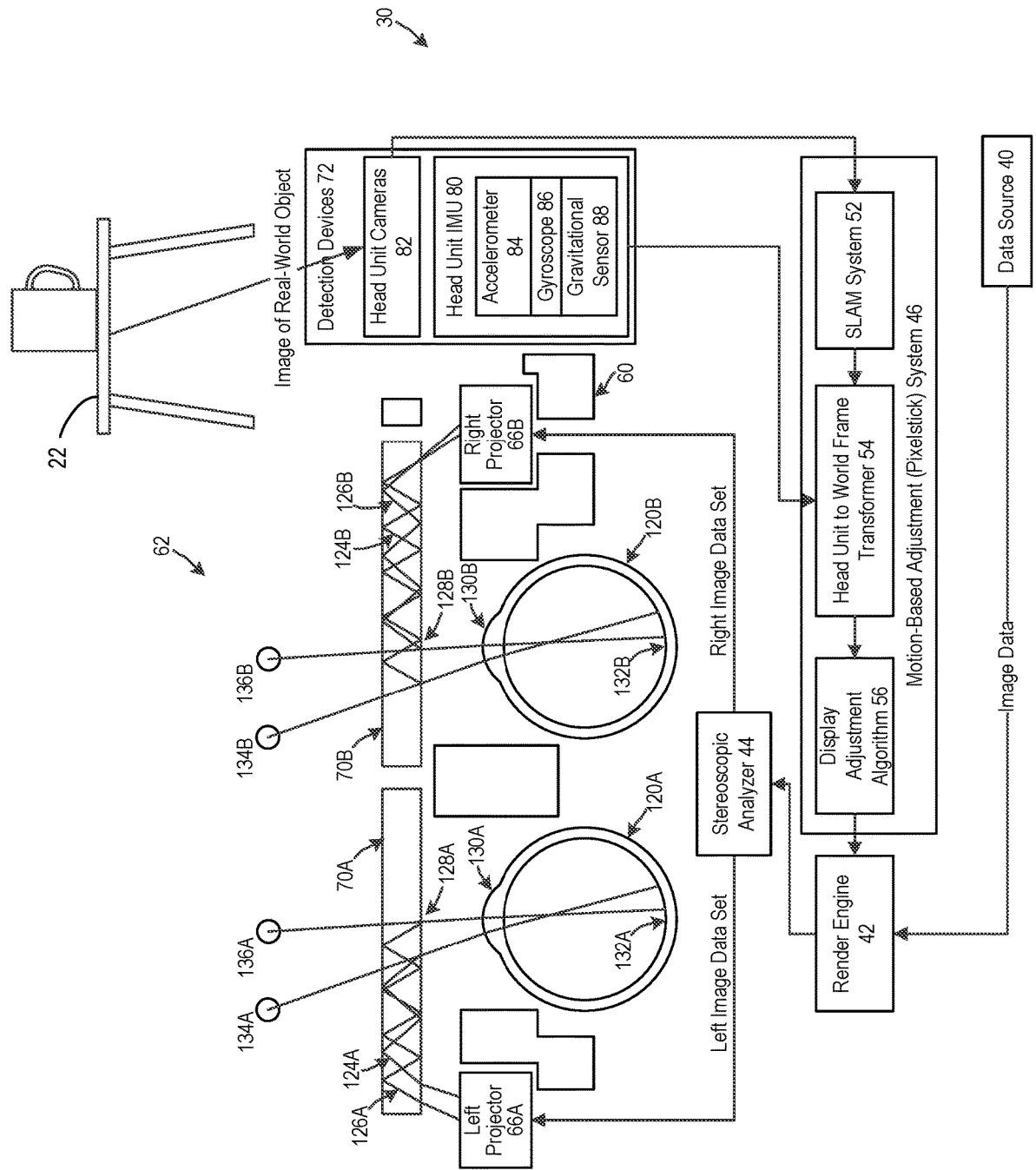
FIG. 3 is a view similar to FIG. 2 with emphasis on a motion-based adjustment system.

As shown in FIG. 3, the motion-based adjustment system 46 includes a simultaneous localization and mapping (SLAM) system 52, a head unit to world frame transformer 54, and a display adjustment algorithm 56. The render engine 42 is connected to the display adjustment algorithm 56. The display adjustment algorithm 56 receives an input from the head unit to world frame transformer 54. The head unit to world frame transformer 54 is connected to the SLAM system 52. The SLAM system 52 is capable of receiving image data, analyzing the image data for purposes of determining objects within images of the image data, and recording the locations of the image data. The head unit to world frame transformer 54 is capable of transforming a head unit coordinate frame to a world coordinate frame.

The stereoscopic analyzer 44 is connected to the render engine 42. The stereoscopic analyzer 44 is capable of determining left and right image data sets from a data stream that is provided by the render engine 42.

The head unit 30 includes a head unit body 60 and display system 62. The head unit body 60 has a shape that fits over a head of a user. The display system 62 is secured to the head unit body 60.

The display system 62 includes left and right projectors 66A and 66B, left and right waveguides 70A and 70B and detection devices 72. The left and right projectors 66A and 66B are connected to power supplies. Each projector 66A or 66B has a respective input for image data to be provided to the respective projector 66A or 66B. The respective projector 66A or 66B, when powered, generates light in two-dimensional patterns and emanates the light therefrom. The left and right waveguides 70A and 70B are positioned to receive light from the left and right projectors 66A and 66B, respectively. The left and right waveguides 70A and 70B are transparent waveguides.

The detection devices 72 include a head unit inertial motion unit (IMU) 80 and one or more head unit cameras 82. The head unit IMU 80 includes an accelerometer 84 (or more than one accelerometer), a gyroscope 86 (or more than one gyroscope) and a gravitational sensor 88. The components of the IMU are typically formed in a semiconductor chip. The accelerometer and the gyroscope are capable of detecting movement of the head unit IMU 80 and the head unit body 60, including movement along three orthogonal axes and rotation about the orthogonal axes. The gravitational sensor 88 is capable of detecting the direction of gravitational force.

The head unit cameras 82 continually capture images from an environment around the head unit body 60. The images can be compared to one another to detect movement of the head unit body 60 and the head of the user wearing the head unit body 60.

The SLAM system 52 is connected to the head unit cameras 82. The head unit to world frame transformer 54 relies on data from the SLAM system 52 and the head unit IMU 80 to transform a coordinate frame of the head unit 30 to a world coordinate frame, namely a coordinate frame that includes a real object such as the table 22 in FIG. 1.

In use, a user mounts the head unit body 60 to their head. Components of the head unit body 60 may, for example, include a strap (not shown) that wraps around the back of the head of the user. The left and right waveguides 70A and 70B are then located in front of left and right eyes 120A and 120B of the user.

The render engine 42 receives image data from the data source 40. The render engine 42 enters the image data into the stereoscopic analyzer 44. The image data is three-dimensional image data of the local content 24 in FIG. 1. The stereoscopic analyzer 44 analyzes the image data to determine left and right image data sets based on the image data. The left and right image data sets are data sets that represent two-dimensional images that differ slightly from one another for purposes of giving the user 10 a perception of a three-dimensional rendering.

The stereoscopic analyzer 44 enters the left and right image data sets into the left and right projectors 66A and 66B. The left and right projectors 66A and 66B then create left and right light patterns. The components of the display system 62 are shown in plan view, although it should be understood that the left and right patters are two-dimensional patterns when shown in front elevation view. Each light pattern includes a plurality of pixels. For purposes of illustration, light rays 124A and 126A from two of the pixels are shown leaving the left projector 66A and entering the left waveguide 70A. The light rays 124A and 126A reflect from sides of the left waveguide 70A. It is shown that the light rays 124A and 126A propagate through internal reflection from left to right within the left waveguide 70A, although it should be understood that the light rays 124A and 126A also propagate in a direction into the paper using refractory and reflective systems.

The light rays 124A and 126A exit the left light waveguide 70A through a pupil 128A and then enter a left eye 120A through a pupil 130A of the left eye 120A. The light rays 124A and 126A then fall on a retina 132A of the left eye 120A. In this manner, the left light pattern falls on the retina 132A of the left eye 120A. The user is given the perception that the pixels that are formed on the retina 132A are pixels 134A and 136A that the user perceives to be at some distance on a side of the left waveguide 70A opposing the left eye 120A. Depth perception is created by manipulating the focal length of the light.

In a similar manner, the stereoscopic analyzer 44 enters the right image data set into the right projector 66B. The right projector 66B transmits the right light pattern, which is represented by pixels in the form of light rays 124B and 126B. The light rays 124B and 126B reflect within the right waveguide 70B and exit through a pupil 128B. The light rays 124B and 126B then enter through a pupil 130B of the right eye 120B and fall on a retina 132B of a right eye 120B. The pixels of the light rays 124B and 126B are perceived as pixels 134B and 136B behind the right waveguide 70B.

The patterns that are created on the retinas 132A and 132B are individually perceived as left and right images. The left and right images differ slightly from one another due to the functioning of the stereoscopic analyzer 44. The left and right images are perceived in a mind of the user as a three-dimensional rendering.

As mentioned, the left and right waveguides 70A and 70B are transparent. Light from a real-life object on a side of the left and right waveguides 70A and 70B opposing the eyes 120A and 120B can project through the left and right waveguides 70A and 70B and fall on the retinas 132A and 132B.

The head unit IMU 80 detects every movement of the head of the user. Should the user 10, for example, move their head counterclockwise and simultaneously move their body together with their head towards the right, such movement will be detected by the accelerometer 84 and gyroscope 86 in the head unit IMU 80. The head unit IMU 80 provides the measurements from the accelerometer 84 and gyroscope 86 to the display adjustment algorithm 56. The display adjustment algorithm 56 calculates a placement value and provides the placement value to the render engine 42. The render engine 42 modifies the image data received from the data source 40 to compensate for the movement of the head of the user. The render engine 42 provides the modified image data to the stereoscopic analyzer 44 for display to the user 10.

The head unit cameras 82 continually capture images as the user moves their head. The SLAM system 52 analyzes the images and identifies images of objects within the image. The SLAM system 52 analyzes movement of the objects to determine a pose position of the head unit body 60. The SLAM system 52 provides the pose position to the display adjustment algorithm 56. The display adjustment algorithm 56 uses the pose position to further refine the placement value that the display adjustment algorithm 56 provides to the render engine 42. The render engine 42 thus modifies the image data received from the data source 40 based on a combination of the motion sensors in the head unit IMU 80 and images taken by the head unit cameras 82. By way of a practical example, if the user rotates their head to the right, a location of the local content 24 rotates to the left within the view of the user thus giving the user the impression that the location of the local content 24 remains stationary relative to the table 22 and other real-world objects.

Figure 4:
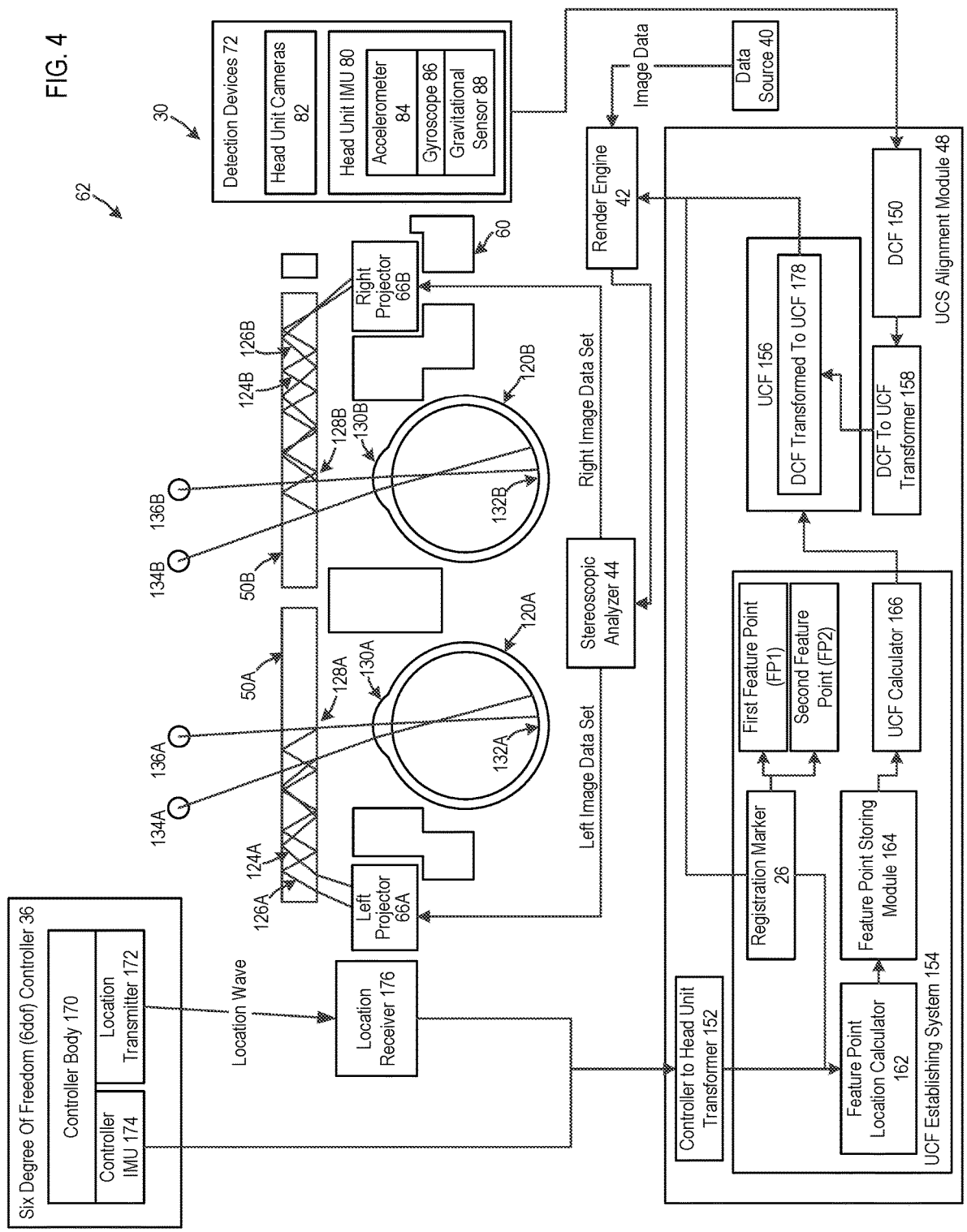
FIG. 4 is a view similar to FIG. 3 with emphasis on a system that is used for registering local content between the users.

Referring to FIG. 4, the UCS alignment module 48 includes a device coordinate frame (DCF) 150, a controller to head unit transformer 152, a user coordinate frame (UCF) establishing system 154, a UCF 156, and a DCF to UCF transformer 158.

The DCF 150 is connected to the gravitational sensor 88 through a combination of hardware, software, and firmware. The gravitational sensor 88 measures a direction of gravitational force relative to the head unit body 60. The DCF 150 is a coordinate frame with three orthogonal axes, wherein one of the axes is aligned with the direction of gravitational force.

The UCF establishing system 154 includes the registration marker 26 shown in FIG. 1, a feature point location calculator 162, a feature point storing module 164, and a user coordinate frame calculator 166. The feature point location calculator 162 is connected through routines and calls to the controller to head unit transformer 152 and receives an input from the registration marker 26. The registration marker 26 is used to select a first feature point (FP1) and a second feature point (FP2). The feature point storing module 164 is connected to the feature point location calculator 162 and stores locations of the first and second feature points FP1 and FP2. The user coordinate frame calculator 166 receives the locations of the feature points FP1 and FP2 from memory and calculates the UCF 156 based on the locations of the first and second feature points, FP1 and FP2.

The 6 dof controller 36 includes a controller body 170, a location transmitter 172 and a controller IMU 174. The controller body 170 has a shape that is convenient for a user to hold on to. The location transmitter 172 and the controller IMU 174 are mounted within the controller body 170. A battery (not shown) within the controller body 170 is used to power the location transmitter 172 and the controller IMU 174.

The head unit 30 includes a location receiver 176. The location receiver 176 is mounted in a stationary position to the head unit body 60.

In use, the user holds the controller body 170 in one of their hands. The user can move the controller body 170 in three orthogonal directions and rotate the controller body 170 about three orthogonal axes. The location transmitter 172 continually transmits a location wave and the location receiver 176 receives the location wave. The location wave includes data indicative of the location of the location transmitter 172 relative to the location receiver 176. Because the location transmitter 172 is stationary within the 6 dof controller 36 and the location receiver 176 is stationary within the head unit 30, the location wave includes data representing a relationship between the 6 dof controller 36 and the head unit 30. The controller to head unit transformer 152 receives data from the location receiver 176 and calculates the location of the 6 dof controller 36 relative to the head unit 30. The controller IMU 174 includes one or more accelerometers and one or more gyroscopes. Data from the controller IMU 174 is wirelessly transmitted from the 6 dof controller 36 and received via a combination of hardware, firmware and software by the controller to head unit transformer 152. The controller to head unit transformer 152 combines the data from the location receiver 176 and the controller IMU 174 in a "fusion" routine. By fusing data from the location transmitter 172 and the controller IMU 174, jitter is reduced when compared to the use of the location transmitter 172 alone.

The registration marker 26 is provided to the render engine 42 and is visualized to the user in a similar manner as the image data from the data source 40. As mentioned above, the user can move the registration marker 26 by moving the 6 dof controller 36. The user uses the registration marker 26 to select the first feature point FP1 and the second feature point FP2. When the user selects the first and second feature points FP1 and FP2, the feature point location calculator 162 calculates a location of the respective feature point FP1 or FP2 within a world frame. The feature point storing module 164 stores the locations of the first and second feature points FP1 and FP2. The UCF calculator 166 then calculates the UCF 156 based on the locations of the first and second feature points FP1 and FP2. The UCF calculator 166 then stores the UCF 156 in memory.

The DCF to UCF transformer 158 transforms the DCF 150 to the UCF 156, resulting in the DCF transformed to UCF 178.

Each one of the users 10 and 12 in FIG. 1 has a different DCF 150 and a different UCF 156 and hence a different DCF transformed to UCF 178. The users 10 and 12 agree on the locations (e.g. verbally agree) on the table 22 where they select the first and second feature points FP1 and FP2. The locations of the first and second feature points FP1 and FP2 appear different from the perspectives of each user 10 and 12 and their mathematical locations are also calculated to be different within the feature point location calculator 162 of each augmented reality viewer 16. However, because the users 10 and 12 select the same feature points FP1 and FP2 within the real world, namely on the table 22, the local content 24 can be rendered in the same location relative to the table 22 from the perspectives of both of the users 10 and 12.

Figure 5:
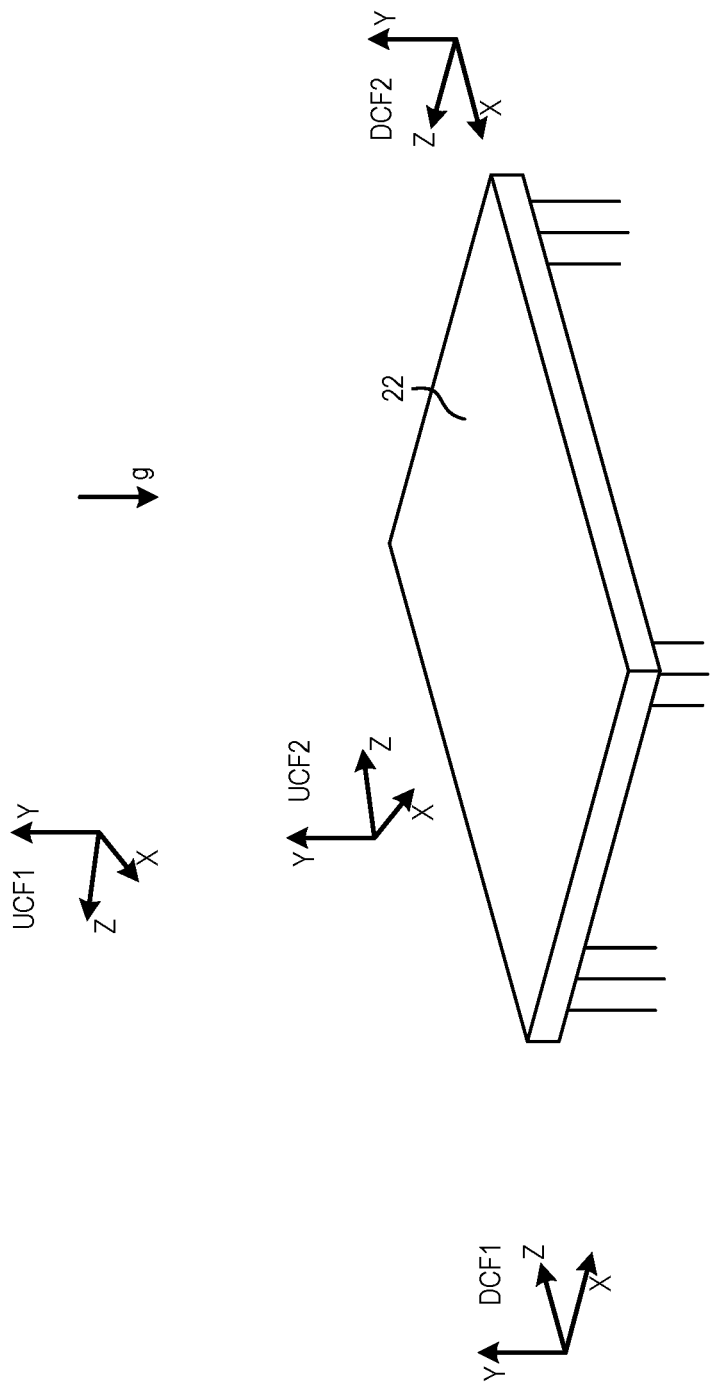
FIG. 5 is a perspective view illustrating the table and various coordinate frames that reside within vision data and algorithms of the respective augmented reality viewers, and further illustrates a direction of gravitational force.

FIG. 5 illustrates the respective coordinate frames before either user establishes a uniform coordinate frame. Each augmented reality viewer has a respective DCF (DCF1 and DCF2). One of the axes (the Y-axis) is aligned with the direction of gravitational force (g) and the other two axes (the X-axis and the Z-axis) are fixed relative to the head unit 30. Neither user has established a UCF. For purposes of illustration only, arbitrary UCF's (UCF1 and UCF2) are shown in the figure and are only included in the figure to show that there is no uniformity in coordinate frames between the augmented reality viewers 16 that are used by the first and second users 10 and 12 (FIG. 1).

Figure 6:
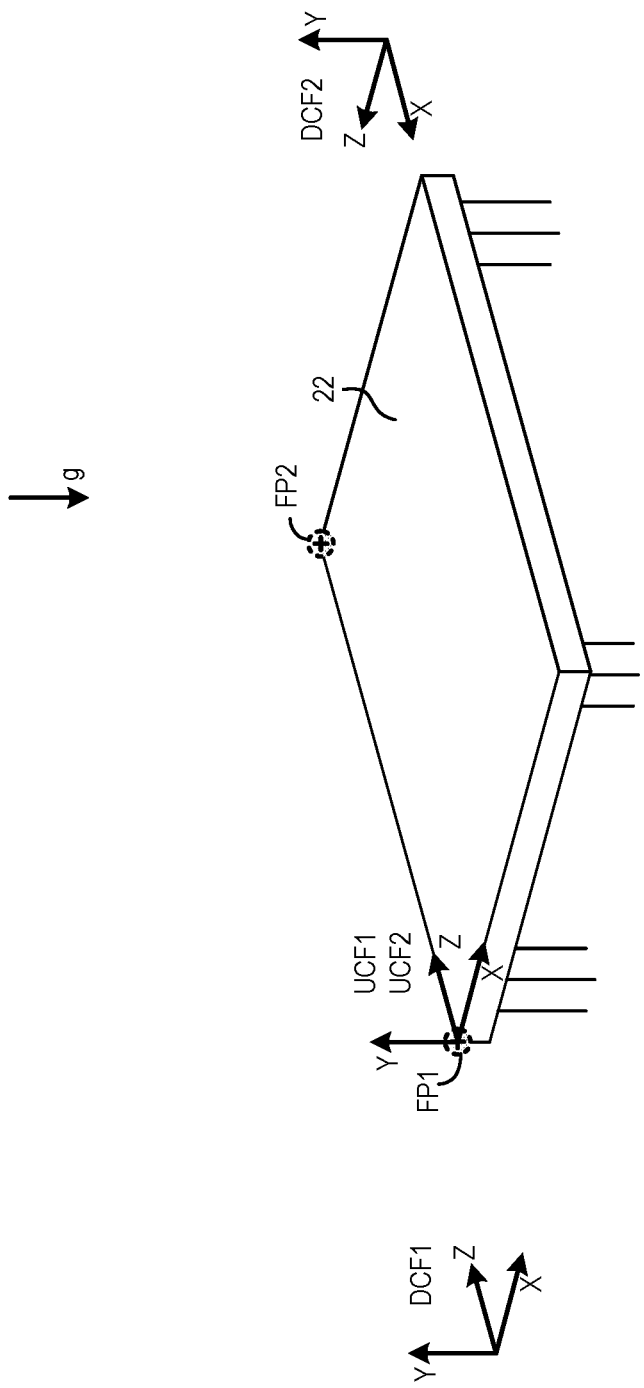
FIG. 6 is a view similar to FIG. 5 illustrating how the users select first and second feature points.

FIG. 6 illustrates the establishment of a UCF for each augmented reality viewer (UCF1 and UCF2). Each user 10 and 12, from their perspective, selects the first and second feature points FP1 and FP2 on the table 22. The respective augmented reality viewers of the respective users then calculate the respective UCF's (UCF1 and UCF 2). Both UCF's (UCF1 and UCF 2) are located and oriented on the same location on the table 22.

Figure 7:
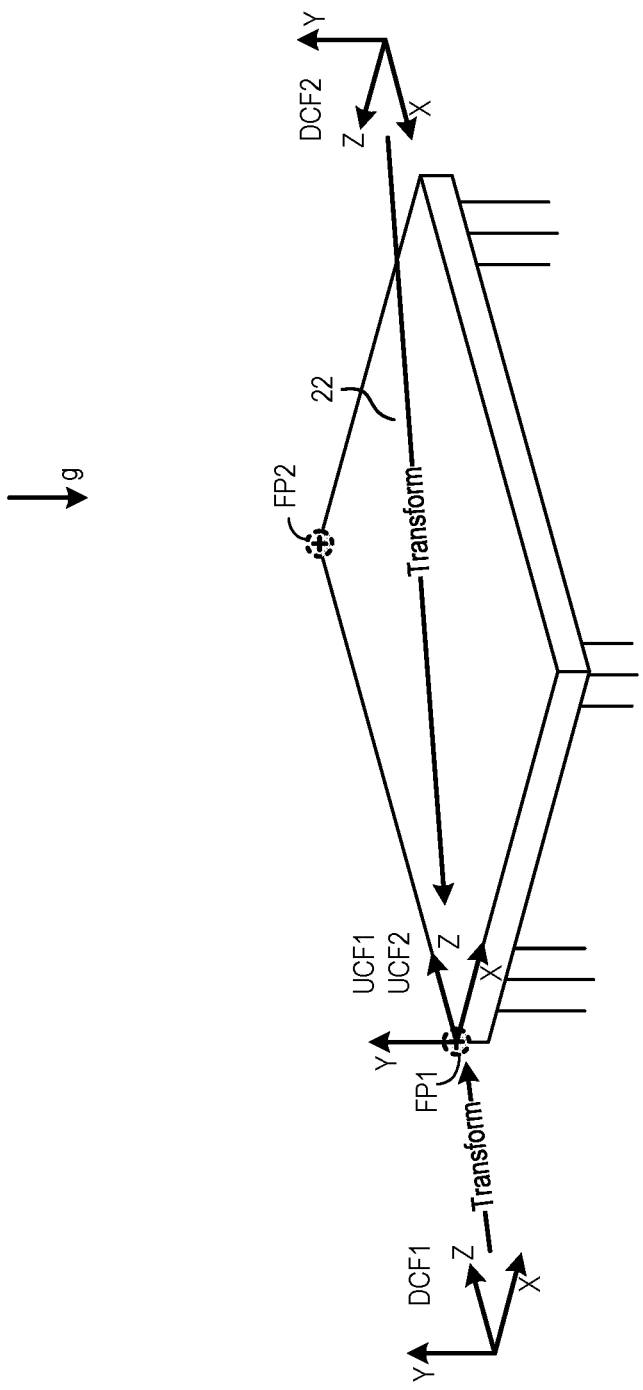
FIG. 7 is a view similar to FIG. 6 illustrating how coordinate frames are transformed.

FIG. 7 illustrates the transformations that are made by the respective DCF to UCF transformers 158 (FIG. 4) of the respective augmented reality viewers. Each augmented reality viewer transforms its respective DCF (DCF1 or DCF2) to its respective UCF (UCF1 or UCF2), respectively. The local content 24 (FIG. 1) is displayed to the respective user based on the respective transformation from the respective DCF (DCF1 or DCF2) to the respective UCF (UCF1 or UCF2).

The viewing system 14 can readily be expanded for use by three, four or more viewing augmented reality viewers that are used by three, four or more users. Each augmented reality viewer has its own DCF (DCF1, DCF2, DCF3 . . . Dafne) and calculates a respective UCF (UCF1, UCF2, UCF3 . . . UCFn) using a respective pair of feature points (FP1 and FP2). Each augmented reality viewer then transforms its respective DCF (e.g., DCF4) to a respective UCF (e.g., UCF4) as described above.

Figure 8:
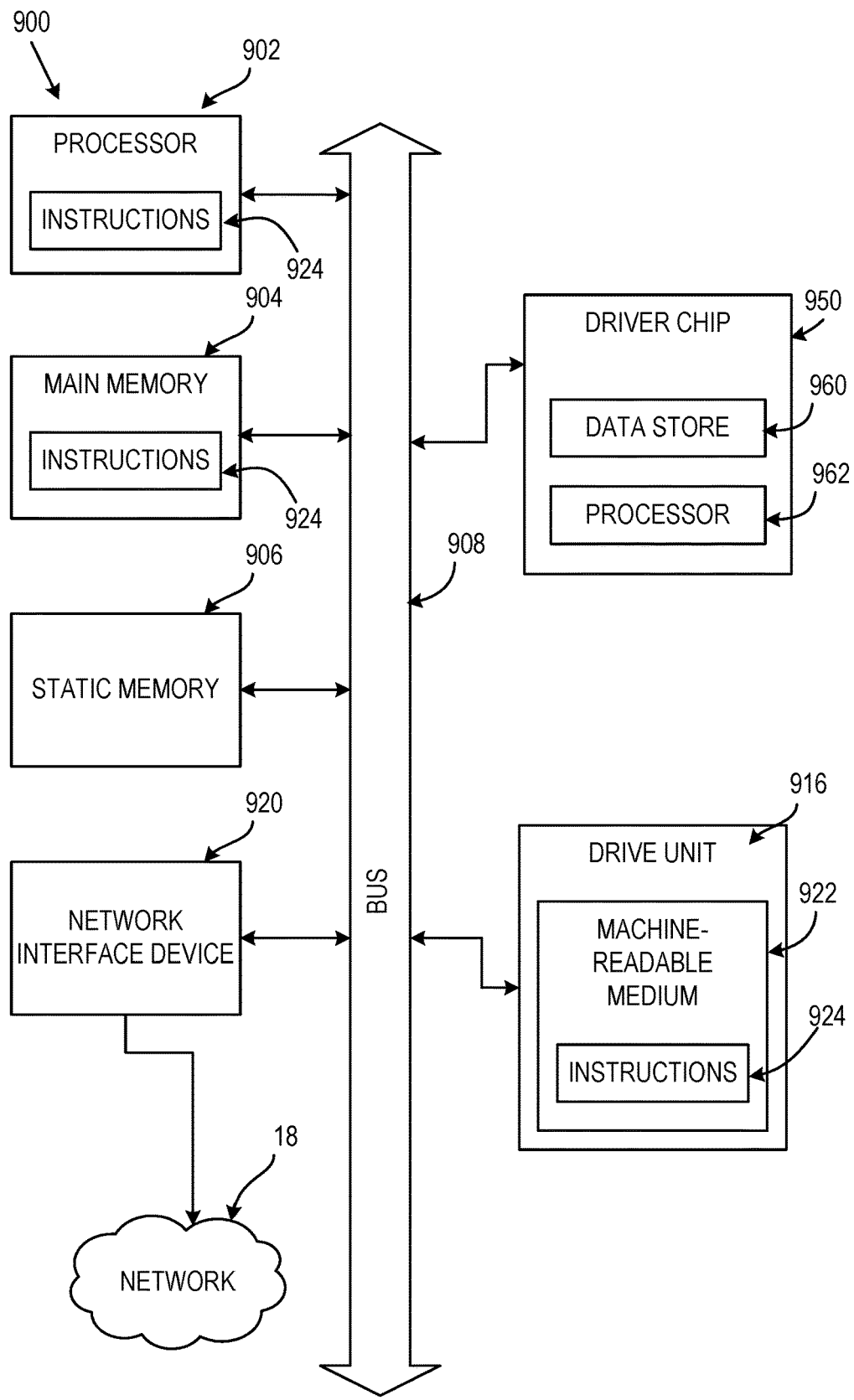
FIG. 8 is a block diagram of a machine in the form of a computer that can find application in the present invention system, in accordance with one embodiment of the invention.

FIG. 8 shows a diagrammatic representation of a machine in the exemplary form of a computer system 900 within which a set of instructions, for causing the machine to perform any one or more of the methodologies discussed herein, may be executed, according to some embodiments. In alternative embodiments, the machine operates as a standalone device or may be connected (e.g., networked) to other machines. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 902 (e.g., a central processing unit (CPU), a graphics processing unit (GPU) or both), a main memory 904 (e.g., read only memory (ROM), flash memory, dynamic random access memory (DRAM) such as synchronous DRAM (SDRAM) or Rambus DRAM (RDRAM), etc.), and a static memory 906 (e.g., flash memory, static random access memory (SRAM), etc.), which communicate with each other via a bus 908.

The computer system 900 may further include a disk drive unit 916, and a network interface device 920.

The disk drive unit 916 includes a machine-readable medium 922 on which is stored one or more sets of instructions 924 (e.g., software) embodying any one or more of the methodologies or functions described herein. The software may also reside, completely or at least partially, within the main memory 904 and/or within the processor 902 during execution thereof by the computer system 900, the main memory 904 and the processor 902 also constituting machine-readable media.

The software may further be transmitted or received over a network 18 via the network interface device 920.

The computer system 900 includes a driver chip 950 that is used to drive projectors to generate light. The driver chip 950 includes its own data store 960 and its own processor 962.

While the machine-readable medium 922 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A viewing system comprising:
   a first augmented reality viewer that includes:
   a first head-mountable frame;
   a first display mounted to the first head-mountable frame that permits a first user to see real world objects;
   a first gravitational sensor mounted to the first head-mountable frame to detect a direction of gravitational force;
   a first data source to hold image data of local content;
   a first projector to display the image data of local content through the first display to the first user while the first user views the real world objects;
   a first processor;
   a first computer-readable medium connected to the first processor; and
   a first set of vision data and algorithms on the first computer-readable medium and executable by the processor, wherein the first set of vision data and algorithms comprises:
   a first device coordinate frame (DCF) with one axis that is fixed relative to gravitational force detected by the first gravitational sensor;
   a first registration marker operable by the first user to select a first feature point (FP1) and a second feature point (FP2) on at least one of the real word objects; and
   a first uniform coordinate system (UCS) alignment module including:
   a first feature point storing module that stores locations of the first registration marker when selecting the FP1 and the FP2;
   a first user coordinate frame calculator determining a first user coordinate frame (UCF) based on the locations of the first registration marker when selecting the FP1 and the FP2;
   a first transformer to transform the first DCF to the first UCF; and
   a first render engine that displays the image data of local content on the first data source based on the transformation from the first DCF to the first UCF.

2. The viewing system of claim 1, further comprising:
   a second augmented reality viewer that includes:
   a second head-mountable frame;
   a second display mounted to the second head-mountable frame that permits a second user to see real world objects;
   a second gravitational sensor mounted to the second head-mountable frame to detect a direction of gravitational force;
   a second data source to hold image data of local content;
   a second projector to display the image data of local content through the second display to the second user while the second user views the real world objects; and
   a second processor;

a second computer-readable medium connected to the second processor;
a second set of vision data and algorithms on the second computer-readable medium and executable by the processor, including:
a second device coordinate frame (DCF) with one axis that is fixed relative to gravitational force detected by the second gravitational sensor;
a second registration marker operable by the second user to select the FP1 and the FP2 on said at least one of the real word objects;
a second uniform coordinate system (UCS) alignment module having:
a second feature point storing module that stores locations of the second registration marker when selecting the FP1 and the FP2;
a second user coordinate frame calculator determining a second user coordinate frame (UCF) based on the locations of the second registration marker when selecting the FP1 and the FP2;
a second transformer to transform the second DCF to the second UCF; and
a second render engine that displays the image data of local content on the second data source based on the transformation from the second DCF to the second UCF.

3. The viewing system of claim 2, wherein the first augmented reality viewer includes:
a first head-mountable frame that is wearable on a head of the first user; and
a first six degree of freedom (6 dof) controller that is movable relative to the first head-mountable frame by the first user to select the FP1 and FP2,
wherein the first set of vision data and algorithms includes:
a first feature point location calculator that determines the locations of the first registration marker when selecting the FP1 and FP2 by determining locations of the first 6 dof controller relative to the first head-mountable frame when selecting the FP1 and FP2; and
a first feature point storing module that stores the locations of the 6 dof controller in the first DCF.

4. The viewing system of claim 3, wherein the second augmented reality viewer includes:
a second head-mountable frame that is wearable on a head of the second user; and
a second six degree of freedom (6 dof) controller that is movable relative to the second head-mountable frame by the second user to select the FP1 and FP2,
wherein the second set of vision data and algorithms includes:
a second feature point location calculator that determines the locations of the second registration marker when selecting the FP1 and FP2 by determining locations of the 6 dof controller relative to the second head-mountable frame when selecting the FP1 and FP2; and
a second feature point storing module that stores the locations of the second 6 dof controller in the second DCF.

5. The viewing system of claim 1, wherein the first viewing device further includes:
a first DCF determining routine executable by the first processor to calculate the first DCF that changes upon movement of the first head-mountable frame; and a first DCF storing instruction executable by the first processor to store the first DCF on the first computer-readable medium.

6. The viewing system of claim 5, wherein the first viewing device further includes:
a first real object detection device that detects positioning of at least one real object;
a first world object identification routine executable by the first processor to identify positioning of at least one point on a surface of the real object;
a first world frame determining routine executable by the first processor to calculate a first world coordinate frame based on the at least one point; and
a first world frame storing instruction executable by the first processor to store the first world coordinate frame on the computer-readable medium, wherein the DCF determining routine determines the DCF relative to the world frame.

7. The viewing system of claim 6, wherein the first real object detection device is a camera.

8. The viewing system of claim 6, wherein the first real object detection device detects positioning of a plurality of real objects.

9. The viewing system of claim 6, wherein the first world object identification routine identifies positioning of a plurality of points on a surface of the real object.

10. The viewing system of claim 9, wherein the first world frame determining routine calculates the first world coordinate frame based on the plurality of points.

11. The viewing system of claim 5, wherein the first viewing device further includes:
a first inertial measurement unit (IMU) secured to the first head-mountable frame, the first IMU including a first gravitational sensor that detects a first direction of gravitational force relative to the first head-mountable frame and the DCF determining routine calculates the DCF frame based on the first direction of gravitational force.

12. The viewing system of claim 11, wherein the first IMU includes at least one of a first accelerometers and a first gyroscope.

13. A method of viewing image data of local content comprising:
creating a first augmented reality view including:
detecting, with a first gravitational sensor mounted to a first head-mountable frame relative to a first display, a direction of gravitational force;
storing a first device coordinate frame (DCF) with one axis that is fixed relative to gravitational force detected by the first gravitational sensor on a first computer-readable medium;
moving, by a first user, a first registration marker to select a first feature point (FP1) and a second feature point (FP2) on at least one real word object viewable by the first user through a first display;
executing a first uniform coordinate system (UCS) alignment module by:
storing locations of the first registration marker when selecting the FP1 and the FP2;
determining a first user coordinate frame (UCF) based on the locations of the first registration marker when selecting the FP1 and the FP2;
transforming the first DCF to the first UCF; and
displaying image data of local content received on a first data source with first projector through the first display to the first user, while the first user views real world objects, based on the transformation from the first DCF to the first UCF.

14. The method of claim 13, further comprising:
creating a second augmented reality view including:
  detecting, with a second gravitational sensor mounted to a second head-mountable frame relative to a second display, a direction of gravitational force;
  storing a second device coordinate frame (DCF) with one axis that is fixed relative to gravitational force detected by the second gravitational sensor on a second computer-readable medium;
  moving, by the second user, a second registration marker to select a first feature point (FP1) and a second feature point (FP2) on at least one the real word object viewable by the user through a second display;
  executing a second uniform coordinate system (UCS) alignment module by:
    storing locations of the second registration marker when selecting the FP1 and the FP2;
    determining a second user coordinate frame (UCF) based on the locations of the second registration marker when selecting the FP1 and the FP2;
    transforming the second DCF to the second UCF; and
  displaying image data of local content received on a second data source with second projector through the second display to the second user, while the second user views the real world objects, based on the transformation from the second DCF to the second UCF.

15. The method of claim 14, further comprising:
wearing, on a head of the first user, a first head-mountable frame; and
moving, by the first user, a first six degree of freedom (6 dof) controller relative to the first head-mountable frame to select the FP1 and FP2;
executing a first feature point location calculator to determine the locations of the first registration marker when selecting the FP1 and FP2 by determining locations of the first 6 dof controller relative to the first head-mountable frame when selecting the FP1 and FP2; and
executing a first feature storing module to store the locations of the 6 dof controller in the first DCF.

16. The method of claim 15, further comprising:
wearing, on a head of the second user, a second head-mountable frame; and
moving, by the second user, a second six degree of freedom (6 dof) controller relative to the second head-mountable frame to select the FP1 and FP2;
executing a second feature point location calculator to determine the locations of the second registration marker when selecting the FP1 and FP2 by determining locations of the second 6 dof controller relative to the second head-mountable frame when selecting the FP1 and FP2; and
executing a second feature storing module to store the locations of the 6 dof controller in the second DCF.

17. The method of claim 13, further comprising:
executing, with a first processor, a first DCF determining routine to calculate the first DCF that changes upon movement of the first head-mountable frame; and
executing, with the first processor, a first DCF storing instruction executable by the first processor to store the first DCF on the first computer-readable medium.

18. The method of claim 17, further comprising:
detecting, with a first real object detection device, positioning of at least one real object;
identifying, with a first world object identification routine executable by the first processor, positioning of at least one point on a surface of the real object;
calculating, with a first world object identification routine executable by the first processor, a first world coordinate frame based on the at least one point; and
storing, with a first world frame storing instruction executable by the first processor, the first world coordinate frame on the computer-readable medium, wherein the DCF determining routine determines the DCF relative to the world frame.

19. The method of claim 18, wherein the first real object detection device is a camera.

20. The method of claim 18, wherein the first real object detection device detects positioning of a plurality of real objects.

* * * * *